(12) United States Patent
Liu et al.

(10) Patent No.: US 12,281,985 B2
(45) Date of Patent: Apr. 22, 2025

(54) METHODS FOR MICROSCOPY WITH ULTRAVIOLET SURFACE EXCITATION (MUSE) IMAGING

(71) Applicant: Case Western Reserve University, Cleveland, OH (US)

(72) Inventors: Yehe Liu, Cleveland, OH (US); Michael Jenkins, Cleveland, OH (US)

(73) Assignee: CASE WESTERN RESERVE UNIVERSITY, Cleveland, OH (US)

(*) Notice: Subject to any disclaimer, the term of this patent is extended or adjusted under 35 U.S.C. 154(b) by 401 days.

(21) Appl. No.: 17/626,292

(22) PCT Filed: Jul. 16, 2020

(86) PCT No.: PCT/US2020/042217
§ 371 (c)(1),
(2) Date: Jan. 11, 2022

(87) PCT Pub. No.: WO2021/011712
PCT Pub. Date: Jan. 21, 2021

(65) Prior Publication Data
US 2022/0268701 A1    Aug. 25, 2022

Related U.S. Application Data

(60) Provisional application No. 62/936,757, filed on Nov. 18, 2019, provisional application No. 62/874,688, filed on Jul. 16, 2019.

(51) Int. Cl.
*G01N 21/64* (2006.01)
*G02B 7/08* (2021.01)
(Continued)

(52) U.S. Cl.
CPC ........... *G01N 21/6458* (2013.01); *G02B 7/08* (2013.01); *G02B 21/082* (2013.01); *G02B 21/16* (2013.01);
(Continued)

(58) Field of Classification Search
CPC ....... G01N 21/6458; G01N 2021/6439; G01N 2201/0221; G01N 2201/0621;
(Continued)

(56) References Cited

U.S. PATENT DOCUMENTS 9,625,387 B2   4/2017 Demos et al.
9,964,489 B2   5/2018 Levenson et al.
(Continued)

FOREIGN PATENT DOCUMENTS

WO    20080093828 A1    8/2008

OTHER PUBLICATIONS

Gareau, Daniel S. "Feasibility of digitally stained multimodal confocal mosaics to simulate histopathology." Journal of biomedical optics 14.3 (2009): 034050.
(Continued)

*Primary Examiner* — Dani Fox
*Assistant Examiner* — Mamadou Faye
(74) *Attorney, Agent, or Firm* — Tarolli, Sundheim, Covell & Tummino LLP

(57) ABSTRACT

Described herein are methods for imaging a fluorescent bioassay (including a substrate, such as dispersed cellular sample, exposed to one or more exogenous fluorophore and/or fluorescent probe that accumulate in a structure of interest). The bioassay can be excited with Type-C ultraviolet (UVC) light produced by one or more light emitting diode (LED). The UVC can have a center wavelength that causes emission by the fluorescent bioassay. A digital optical device can collect a signal emitted from the fluorescent bioassay in response to the excitation. The methods relate in particular to Microscopy with Ultraviolet Surface Excitation (MUSE) imaging.

20 Claims, 14 Drawing Sheets

(51) Int. Cl.
*G02B 21/08* (2006.01)
*G02B 21/16* (2006.01)
*G02B 21/36* (2006.01)

(52) U.S. Cl.
CPC ........... *G02B 21/36* (2013.01); *G02B 21/361* (2013.01); *G02B 21/367* (2013.01); *G02B 21/368* (2013.01); *G01N 2021/6439* (2013.01); *G01N 2201/0221* (2013.01); *G01N 2201/0621* (2013.01)

(58) Field of Classification Search
CPC .. G01N 21/648; G01N 2201/062; G02B 7/08; G02B 21/082; G02B 21/16; G02B 21/36; G02B 21/361; G02B 21/367; G02B 21/368; G02B 13/143; G02B 21/0008; G02B 21/0032; G02B 21/0076; G02B 21/34; G03B 17/565; H04N 23/55; H04N 23/56
See application file for complete search history.

(56) References Cited

U.S. PATENT DOCUMENTS

| | | | |
|---|---|---|---|
| 2011/0026030 A1* | 2/2011 | Schleipen | G01N 21/41 356/432 |
| 2016/0077007 A1 | 3/2016 | Demos et al. | |
| 2016/0341664 A1* | 11/2016 | Rothberg | H01L 27/14603 |
| 2017/0191937 A1* | 7/2017 | Levenson | G01N 21/6445 |
| 2018/0275058 A1* | 9/2018 | Stern | G01N 21/645 |

OTHER PUBLICATIONS

Han, Jefferson Y. "Low-cost multi-touch sensing through frustrated total internal reflection." Proceedings of the 18th annual ACM symposium on User interface software and technology. 2005.
Switz, Neil A., Michael V. D'Ambrosio, and Daniel A. Fletcher. "Low-cost mobile phone microscopy with a reversed mobile phone camera lens." PloS one 9.5 (2014): e95330.
International Search Report for Application Serial No. 2020042217, Nov. 3, 2020.
Fereidouni, Farzad, et al. "Microscopy with ultraviolet surface excitation for rapid slide-free histology." Nature biomedical engineering 1.12 (2017): 957-966.

* cited by examiner

METHODS FOR MICROSCOPY WITH ULTRAVIOLET SURFACE EXCITATION (MUSE) IMAGING

CLAIM OF PRIORITY

This application claims priority to U.S. Provisional Application Ser. No. 62/874,688, filed Jul. 16, 2019, entitled "Improved Microscopy Devices, Systems, and Methods" and to U.S. Provisional Application Ser. No. 62/936,757, filed Nov. 18, 2019, entitled "Systems and Methods for Improved Light Sheet Microscopy". The entirety of these provisional applications is hereby incorporated by reference for all purposes.

TECHNICAL FIELD

The present disclosure relates generally to Microscopy with Ultraviolet Surface Excitation (MUSE) imaging and, more specifically, to methods for MUSE imaging.

BACKGROUND

Equipped with high-performance digital cameras, modern mobile devices provide a highly accessible platform for advanced imaging tasks such as optical microscopy. Mobile device microscopes have shown utility, especially when access to benchtop microscopes is limited; however, current smartphone microscope designs are often limited by significant trade-offs between cost, imaging performance, and functionality. These limitations can provide problems when using techniques like Microscopy with Ultraviolet Surface Excitation (MUSE) imaging with a mobile device microscope.

The simplicity of MUSE imaging could enable many microscopy applications (e.g., histology) that are otherwise difficult to achieve with mobile device microscopy. However, a major engineering difficulty exists when adding functionality for MUSE imaging a mobile device microscope—namely, the illumination for MUSE imaging must be installed between the sample and the microscope objective, but mobile device microscopes often have very a small working distance, leading to a small clearance between the sample and the objective. Most conventional type-C ultraviolet (UVC) light emitting diodes (LEDs) cannot fit in the small clearance. Additionally, by using only a UVC light source, MUSE imaging is simpler than other multicolor fluorescent microscopy applications, which require several excitation light sources and filters/dichroic mirrors, which are often bulky and costly, while the UVC excitation light source of MUSE imaging is readily filtered by the optical elements of mobile device lenses.

SUMMARY

Provided herein are methods for Microscopy with Ultraviolet Surface Excitation (MUSE) imaging. As an example, the MUSE imaging can be conducted by a mobile device microscope, but the microscope need only be a microscope having one or more digital image sensor/detecting device.

In one aspect, the present disclosure can include a method for MUSE imaging. The method can include: exposing a dispersed cellular sample to one or more exogenous fluorophore and/or fluorescent probe that accumulate in a structure of interest; exciting the one or more exogenous fluorophore and/or fluorescent probe within the sample with Type-C ultraviolet (UVC) light, produced by one or more light emitting diode (LED), having a center emission wavelength that causes emission by the one or more exogenous fluorophore and/or fluorescent probe; and collecting, with a microscope having one or more digital image sensor, an image comprising the sample with the excited one or more exogenous fluorophore and/or fluorescent probe.

In another aspect, the present disclosure can include another method for MUSE imaging. The method can include: obtaining a fluorescent bioassay; exciting the bioassay with Type-C ultraviolet (UVC) light, produced by one or more light emitting diode (LED), having a center emission wavelength that causes emission by the fluorescent bioassay; and collecting, with a digital optical detecting device, a signal emitted from the fluorescent bioassay.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

I. Definitions

Figure 1:
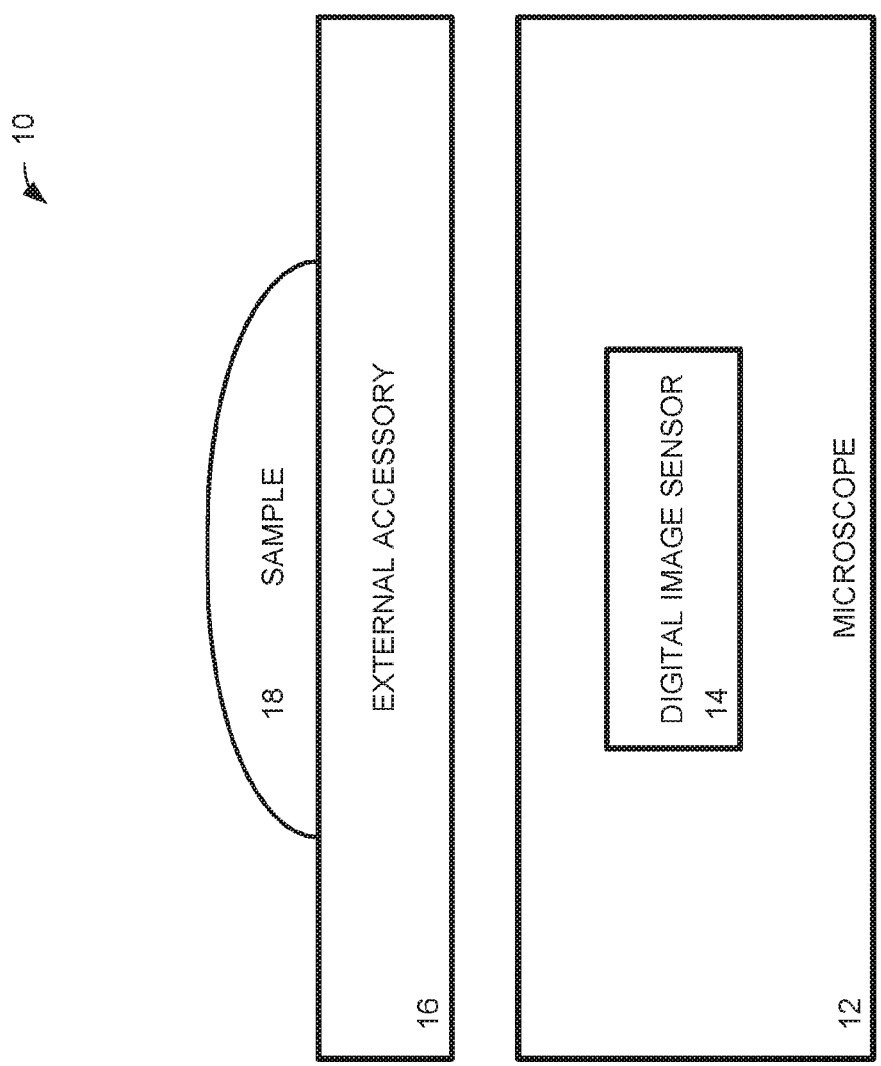
FIG. 1 is a diagram showing an example of a microscope that can be used to perform Microscopy with Ultraviolet Surface Excitation (MUSE) imaging.

Unless otherwise defined, all technical terms used herein have the same meaning as commonly understood by one of ordinary skill in the art to which the present disclosure pertains.

As used herein, the singular forms "a," "an" and "the" can also include the plural forms, unless the context clearly indicates otherwise.

As used herein, the terms "comprises" and/or "comprising," can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "Microscopy with Ultraviolet Surface Excitation (MUSE) imaging" can refer to a microscopy method utilizing ultraviolet (UV) surface excitation to generate high-quality images of one or more samples.

As used herein, the term "imaging" can refer to methods and technologies for visualizing and examining structures not observable with the naked eye. One example type of imaging is medical imaging, in which visual representations of anatomical structures and biological samples are created for diagnostic, treatment, or research purposes.

As used herein, the term "microscopy" can refer a type of imaging that examines a sample using a microscope. Types of microscopy can include, for example, bright field microscopy, MUSE, a hybrid between bright field microscopy and MUSE, or the like.

As used herein, the term "microscope", also referred to as an optical microscope or a light microscope, can refer to an instrument that uses light and a system of lenses to generate magnified images of a sample.

As used herein, the term "ultraviolet (UV) light" can refer to a type of electromagnetic radiation with wavelength shorter than that of visible light, but longer than X-rays. For example, UV light can have a wavelength from 10 nm to 400 nm. One specific type of UV light is Type-C ultraviolet (UVC) light, having a center wavelength from 230 nm to 290 nm.

As used herein, the term "mobile device microscope" can refer to a mobile device (also referred to as a mobile electronic device) with the capability of photography, such as a smartphone, a tablet computer, a digital camera, a laptop computer, or the like, being used as a microscope (either alone or with one or more accessories).

As used herein, the terms "accessory", "external accessory", "attachment", "external attachment", or the like, can refer to a device that can be attached or added to a mobile device to increase the utility, efficiency, or versatility of the mobile device. For example, an accessory can be attached to the mobile device to increase the ability of the mobile device to operate as a microscope.

As used herein, the term "resolution" can refer to the level of detail contained within an image (represented by the number of pixels, the size of the pixels, or the like). A high resolution image can include more detail than an image with a lesser resolution and, for example, can have pixels sized on the order of microns/micrometers.

As used herein, the term "focal length" can refer to the distance between the optical center of the lens to its focal point.

As used herein, the term "imaging relay" between at least two lenses can refer to the transmission of an image of the front focal plane of one lens to be generated at an image sensor of another lens. The imaging relay can be used to magnify the specimen.

As used herein, the term "photographic camera" can refer to an optical instrument that includes at least one camera lens and at least one digital image sensor. The photographic camera may be integrated within a mobile device.

As used herein, the term "camera lens" (also referred to as a "photographic lens" or "photographic objective") can refer to an optical lens or assembly of lenses of a photographic camera that can be paired with an image sensor.

As used herein, the term "image sensor" can refer to a device that converts light striking a camera lens into an electronic signal (the electronic signal can be transformed into a digital image by a processor, for example).

As used herein, the term "objective lens" can refer to a lens within an optical system that is located closest to the sample. The objective lens can be a compound lens and/or be part of a compound lens.

As used herein, the term "compound lens" can refer to multiple lenses that are arranged on a common axis. The compound lens can be used to increase magnification of a sample. At least one of the multiple lenses within the compound lens can be an aspheric lens (in these instances, the compound lens is referred to as an "aspheric compound lens").

As used herein, the term "sample" can refer to a small part used for testing or examination to show what the whole is like. For example, the sample can be a biological sample, in which the whole is an organic material, such as blood, interstitial fluid, tissue, bone, etc.

As used herein, the term "total internal reflection" can refer to a phenomenon in which light traveling through one transparent medium reaches an interface with a second, less dense transparent medium and fully reflects back into the denser medium at the angle of incidence (the angle at which the light hits the interface between the two media). Frustrated total internal reflection can refer to a phenomenon in which some of the light hitting the interface between the two transparent media is not reflected. This can occur when a third medium with a higher refractive index abuts the interface between the first two media.

As used herein, the term "exogenous" can refer to a substance originating outside of a body.

As used herein, the term "excite", "excitation" or the like, can refer to raising the energy of a particle, atom, nucleus, or molecule above its ground or baseline state.

As used herein, the term "histology" can refer to the study of microscopic biological structures.

As used herein, the term "stain", "staining" or the like, can refer to the use of one or more selected dyes on specimens to increase the visibility of certain structures. Examples of stains can include a fluorescent probe, a fluorophore, or the like.

As used herein, the terms "fluorescent probe" and "fluorophore" can refer to a fluorescent material, molecule, substance, or the like that can change its fluorescence emission (re-emit light) upon light excitation.

II. Overview

Microscopy with Ultraviolet Surface Excitation (MUSE) uses type-C ultraviolet (UVC) light to be delivered to a sample surface to excite fluorophores on the sample surface. Because penetration of such UVC light is shallow in biological samples, it provides great optical sectioning on the sample surface. Many conventional dyes, such as DAPI and Eosin, are excitable in this UVC light wavelength range (e.g., center wavelength between 230 nm and 290 nm). The multispectral fluorescence emission from the dyes and the tissue autofluorescence is imaged directly with a microscope having a digital image sensor, such as a bright-field microscope and an RGB camera generally or a smart phone microscope specifically, creating images with similar or more information compared to H&E stained slides. The images can be interpreted by human experts, processed to mimic standard H&E data, or used for diagnosis with machine learning algorithms.

MUSE imaging and mobile device microscopes create several synergistic effects when combined together. However, the requirement of UVC light limits the use of mobile device microscopes with MUSE imaging. UVC light cannot be transmitted through most glass and polymer materials, so the UVC light must be delivered between the microscope objective and the sample, which has proved to be nearly impossible using a mobile device microscope due to very limited spacing between the objective lens and the sample. The methods described herein can be used with the mobile device microscope by employing a compact and low cost external accessory for the mobile device that can excite a sample based on frustrated total internal reflection (FTIR) and this excitement can be used to perform high resolution MUSE imaging. (It should also be noted that the external accessory leaves the mobile device with the capabilities of a basic bright-field microscope.) The external accessory requires only minor structural modifications based on the original design concepts of MUSE imaging and mobile device microscopes. The external attachment uses a UVC-transparent optical window/sample holder as the total internal reflection waveguide, allowing for uniform delivery of UVC light to the sample (held onto the microscope by surface tension) through the space between the objective lens and the sample. Traditionally, a thin optical window (<0.25 mm—quartz or fused silica) has been used as the sample holder, but the external attachment uses a thick optical window (>0.5 mm, similar to or thicker than the width of a conventional UVC LED emitter) as both the sample holder and the total internal reflection (TIR) waveguide. When the sample is in contact with the optical window, TIR is disrupted and the UVC light leaks out to the sample. Using a UVC LED with a few milliwatt optical power is sufficient to generate detectable fluorescence signals and create MUSE contrast with a mobile device microscope.

III. System

One aspect of the present disclosure can include a system 10 (shown in FIG. 1) that can be used to perform Microscopy with Ultraviolet Surface Excitation (MUSE) imaging for research and diagnostic applications. The system 10 can include a microscope 12 having one or more image sensors (e.g., digital image sensor 14 shown in FIG. 1, which can also be referred to as a digital optical detecting device) and an external accessory 16 that can hold a sample 18. The external accessory 16 can include at least one or more light sources (providing Type-C ultraviolet (UVC) light) and a sample holder. Type-C ultraviolet (UVC) light, having a center wavelength from 230 nm to 290 nm, is required to conduct the MUSE imaging, but UVC cannot transmit through most glass and polymer materials. Accordingly, the external accessory 16 must cast the UVC light onto the sample surface with at least one UVC light emitting diode (LED) placed between the microscope objective and the sample.

A fluorescent bioassay (e.g., a biological sample also referred to as a substrate stained with a fluorescent marker or probe) can be obtained and placed on the microscope 10. The biological sample can include, for example, plant cells, fungus cells, bacteria cells, algae cells, animal cells, or the like. The fluorescent marker within the bioassay can be excited by the UVC light (e.g., produced by the one or more light sources, such as light emitting diodes (LEDs)). The UVC light can have a center emission wavelength that causes emission by the fluorescent bioassay.

The digital image sensor 14 can be configured to collect a digital emitted from the fluorescent bioassay. The digital image sensor 14 (also referred to as a digital optical detecting device) can include one or more diffractive optical element and one or more electro-optical sensor. The one or more optical detecting device can be a single optical lens, a compound optical lens, a freeform waveguide, or the like. The optical detecting device can have less than 5% total optical transmittance between 230 nm and 290 nm. The one or more electro-optical sensor can be a camera sensor, a photodiode, a photomultiplier tube, or the like. The electro-optical sensor can be configured to detect and separate emitted light from fluorescent probes at one or more wavelength ranges from 350 nm to 700 nm, for example.

Figure 2:
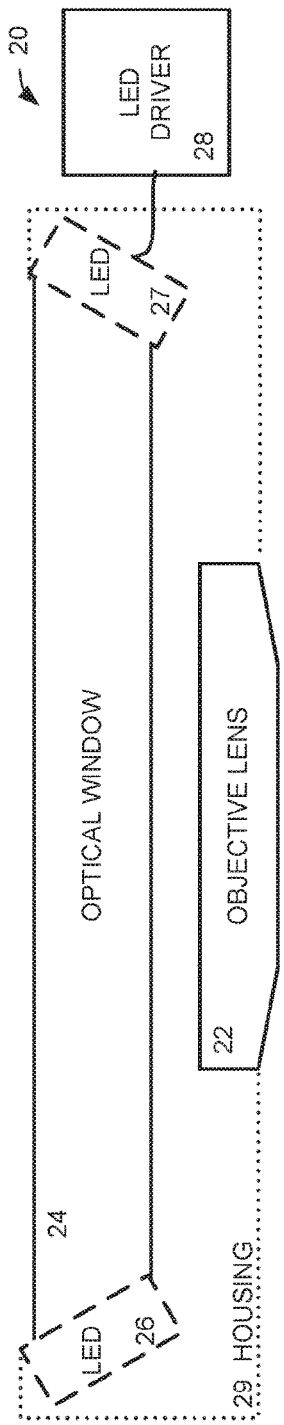
FIG. 2 is a diagram showing an example of an external accessory that allows a mobile device to perform microscopy imaging with Type-C ultraviolet (UVC) light excitation.

FIG. 2 shows an example external accessory 20 that can be used as the external accessory 16. It should be noted that the external accessory 16 can be in different forms than that of the external accessory 20.

The external accessory 20 can allow the MUSE imaging to be conducted by a mobile device microscope with only minor modifications. The external accessory 20 can provide a way for UVC light to be transmitted within very limited spacing between a microscope objective and a sample to deliver the UVC light to the sample surface to excite the sample.

The external accessory 20 is a compact and low cost attachment to a mobile device. As illustrated, the external accessory 20 includes an objective lens 22 (or compound lens), an optical window 24, one or more light emitting diodes (LEDs) 26 and/or 27, and an LED driver 28. At least a portion of one or more of the objective lens 22, the optical window 24, the one or more LEDs 26 and/or 27, and the LED driver can be encased in one or more housings (illustrated as housing 29). The housing 29, in some instances, can be configured to attach to a mobile device to position the external accessary 20 relative to the mobile device. In other instances, the housing 29 can simplify focusing by ensuring that a focal spot is pre-aligned, making the configuration very convenient to work with in the field when a stable work bench is not available. Moreover, it will also be understood that the LED driver 28 need not be physically connected to the LED 27. Instead, the LED driver 28 can be coupled to any part of the external accessory 20 to power and/or control the LEDs 26, 27. The components of the external accessory 20 can be constructed at a low cost—for example, the whole assembly can be produced easily for under $30 in material cost with widely-available tools.

Figure 3:
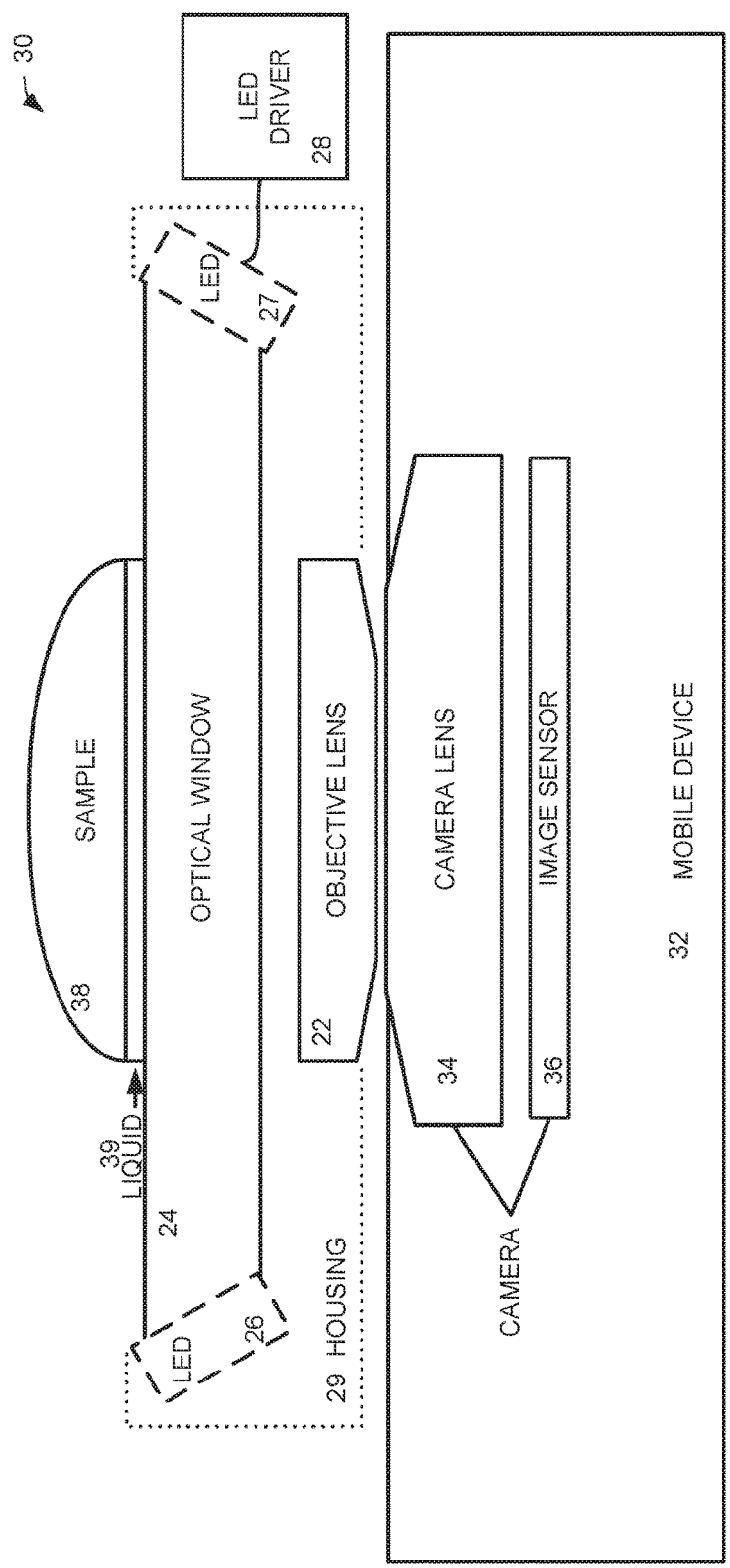
FIG. 3 is a diagram showing an example of a system that performs microscopy imaging using the external accessory of FIG. 1 to perform microscopy imaging.

The external accessory 20 can be attached to a mobile device 32 to form a system 30 as shown in FIG. 3. For example, the housing 29 can include an attachment mechanism to facilitate the attachment of the external accessory 20 to the mobile device. As an example, the attachment mechanism can include an adhesive material. As another example, although not illustrated, the attachment mechanism can include the LED driver 28 being connected to the mobile device 32.

The objective lens 22 (or compound lens) can be configured to be placed in front of a camera lens 34 of the mobile device 32 (so that the objective lens 22 center aligns with the camera lens 34, which may include an automatic process). For example, the housing 29 can be specifically configured for the mobile device 32 to ensure that the objective lens 22 aligns with the camera lens 34. The objective lens 22 (or compound lens) can be an inexpensive lens and/or an aspherical lens, such as a reverse camera lens from an older-model smartphone, an infinite corrected microscope objective, or the like. While the inexpensive lens and/or the aspheric lens generally has good microscopy performance, the inexpensive lens can generally have a very limited focal length; in order to achieve higher resolution, the inexpensive lens is designed for an image sensor with an even shorter focal length (<1 mm, for example). The purpose of the objective lens 22 (or compound lens) is to form an imaging relay with the camera lens 34 so that an image of a front focal plane of the objective lens 22 (or compound lens) is generated at an image sensor 36 (e.g., similar to the digital image sensor 14 shown in FIG. 1) of the camera lens 34 of the mobile device 32.

The optical window 24 can be configured to be located/placed in front of (or above) the objective lens 22 (or compound lens)—in other words, between the objective lens 22 (or compound lens) and the sample 38 (which can, in some instances, be a biological sample and/or may be stained. The optical window 24 can be positioned such that a front surface of the optical window overlaps the front focal plane of the objective lens 22 (or compound lens). In some instances, at least a portion of the optical window 24 can include a sample holder. However, the optical window 24 may include additional hardware to facilitate positioning or holding the sample 38. In some instances, the sample 38 can be held onto/within the sample holder by surface tension (e.g., provided by liquid 39). The optical window 24 can be transparent to UVC light. For example, the optical window 24 can be at least partially made of quartz, fused silica, and/or UV transparent sapphire.

One or more light emitting diode (LED) (e.g., LED 26 and/or LED 27) can be positioned at one or more side-edges of the optical window 24. The one or more LED (e.g., LED 26 and/or LED 27) can be configured to emit UVC light through the optical window 24. As the UVC light transmits through the optical window 24, the UVC light can excite at least a portion of the sample 38 (e.g., the stain associated with the sample 38). As an example, the optical window 24 can exhibit a transmittance greater than 50% at the center wavelength of the one or more LEDs (e.g., LED 26 and/or LED 27).

The one or more LEDs (e.g., LED 26 and/or LED 27) are powered and controlled by an externally triggered LED driver 28 (in some instances, the LED driver 28 can power and control the one or more LEDs, but in other instances, the LED driver 28 can be linked to/paired with a separate LED controller that can, for example, regulate current to the LEDs). The LED driver 28 can be triggered by a mechanical button (which is pressed electronically, by a person, or the like), a digital signal from the mobile device 32, a flash light signal from the mobile device 32, or the like. The LED driver 28 can be powered by an external battery or other external power source, in some instances. In other instances, the LED driver 28 can be powered by an integrated battery of the mobile device 32 (in instances when the LED driver 28 is connected to the mobile device 32). It should be understood that in instances where the LED driver 28 and LED controller are separate, each may be powered by an integrated battery of the mobile device 32 and/or powered by an external battery or other external power source.

In order to acquire good microscopy imaging, many modalities require thin samples, which are difficult to prepare in many scenarios; the external accessory 20 allows for imaging using thick samples by sampling the surface directly, enabling a broad range of applications that could not be done with mobile device microscopes previously. Since MUSE imaging requires illumination with UVC light and UVC light cannot transmit through most glass and polymer materials, it is impossible to use conventional microscope lenses or mobile device camera lenses to deliver the light. In traditional MUSE microscope configurations, UVC light is cast onto the sample surface by an LED placed between the microscope objective and the sample. However, with limited spacing between the objective lens 22 (or compound lens) and the sample 28, the traditional approach would require a significantly more complicated and costly setup.

Figure 4:
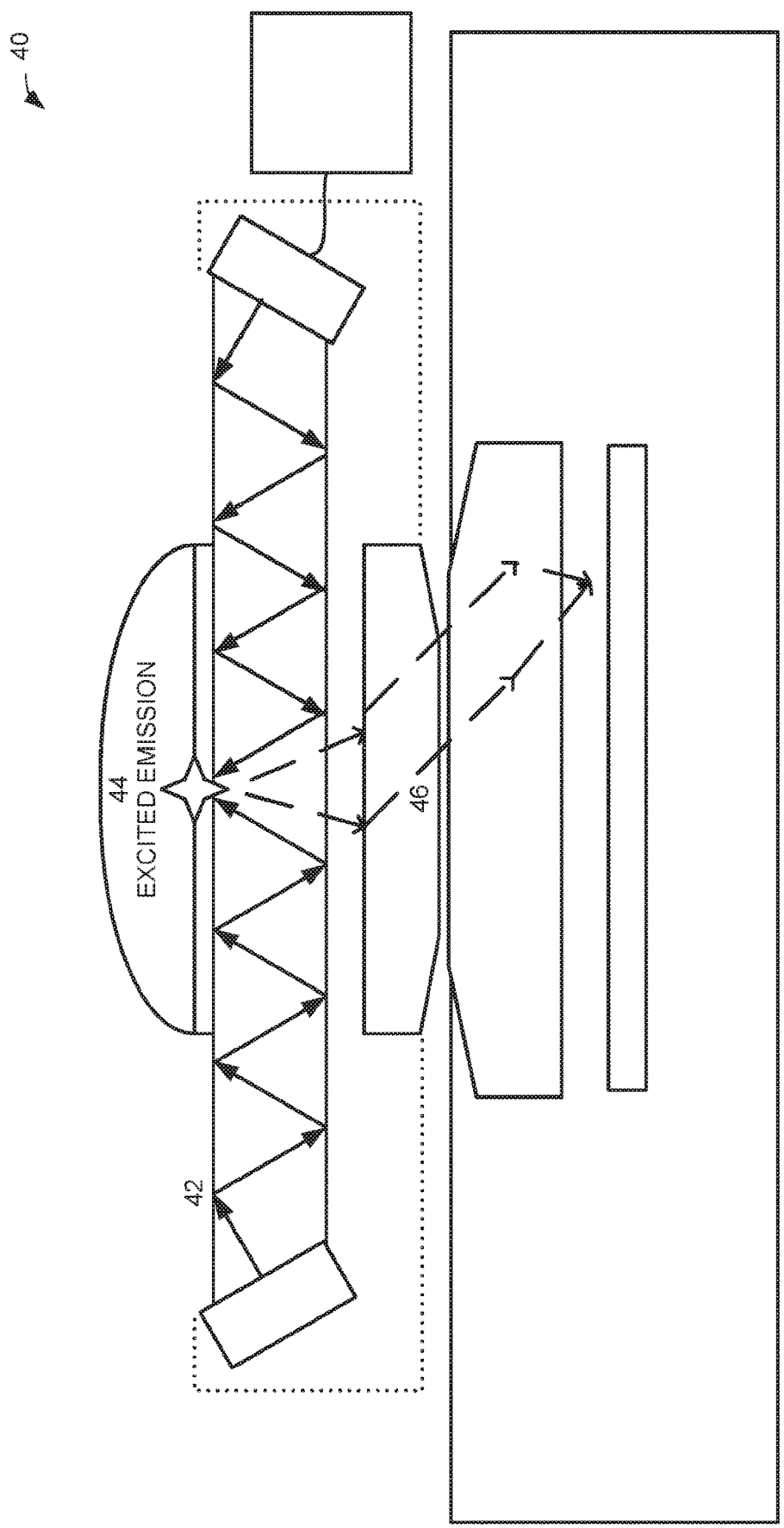
FIG. 4 is a diagram showing an example of operation of the LEDs and optical window of the external accessory of FIG. 1 exciting a sample particle, and the excitation being detected by the mobile device of FIG. 2.

The external accessory 20 is designed based on the optical concept of frustrated total internal reflection (FTIR). FTIR is easy to implement and has been used in many consumer applications, such as touch sensing and transparent drawing boards. The optical window 24 of the external accessory 20 facilitates the FTIR, acting as the optical window, the sample holder, and a total internal reflection waveguide, as shown in FIG. 4 (FIG. 3 will also be used in the description of FIG. 4). Acting as the TIR waveguide, the optical window 24 allow UVC to be uniformly delivered to the sample in the space between the objective lens 22 (or compound lens) and the sample 38.

The external accessory 20 only requires minor structural modifications compared to the original design concepts of MUSE imaging and traditional mobile device microscopes. Instead of using a thin optical window (<0.25 mm—quartz or fused silica) as the sample holder (like with traditional MUSE imaging), the external accessory 20 uses a thick optical window 24 (>0.5 mm, similar to or thicker than the width or length of a conventional UVC LED emitter) as both the sample holder and the TIR waveguide. The UVC LED emitter (e.g., used as elements 26 and/or 27) can have an optical power of a few milliwatts.

The external accessory 20 employs the one or more LEDs 26 and/or 27 on one or more lateral side-edges of the optical window 24 to emit and transmit UVC light 42 through the optical window. The UVC light 42 emitted from one or more of the LEDs 26, 27 is guided through the optical window 24 of the attachment 20 using TIR. When at least a portion of the sample 38 (in contact with the optical window 24 through liquid 39), the TIR is disrupted and the UVC light 42 can leak out into the sample 38. The leaked UVC light 32 can excite the sample to create an excited emission 44. The emitted light 46 is transmitted through the objective lens 22 (or compound lens), through the camera lens 34, to the image sensor 36. The UVC LED emitter (e.g., used as elements 26 and/or 27) can have an optical power of a few milliwatts and be sufficient to generate detectable fluorescence signals and create MUSE imaging contrast with a mobile device camera.

The external attachment 20 can excite a sample based on frustrated total internal reflection (FTIR) and this excitement can be used to perform high resolution MUSE imaging. (It should also be noted that the external accessory leaves the mobile device with the capabilities of a basic bright-field microscope.) The external attachment uses a UVC-transparent optical window/sample holder as the total internal reflection waveguide, allowing for uniform delivery of UVC light to the sample (held onto the microscope by surface tension) through the space between the objective lens and the sample. Traditionally, a thin optical window (<0.25 mm—quartz or fused silica) has been used as the sample holder, but the external attachment uses a thick optical window (>0.5 mm, similar to or thicker than the width of a conventional UVC LED emitter) as both the sample holder and the total internal reflection (TIR) waveguide. When the sample is in contact with the optical window, TIR is disrupted and the UVC light leaks out to the sample. Using a UVC LED with a few milliwatts of optical power is sufficient to generate detectable fluorescence signals and create MUSE contrast with a mobile device microscope.

Figure 5:
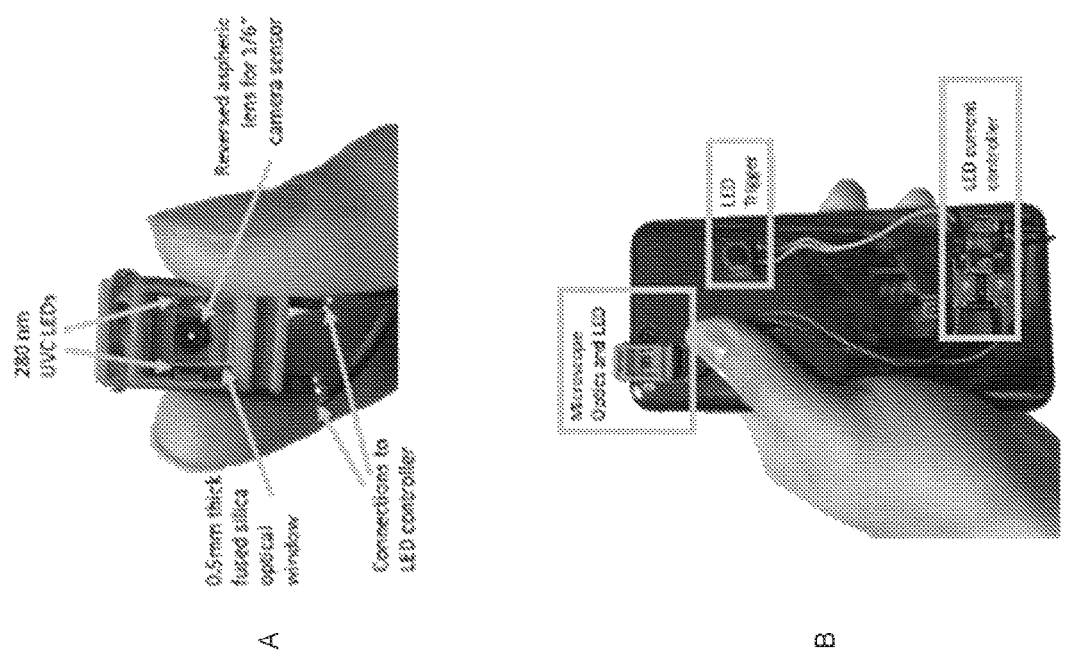
FIGS. 5 and 6 include photographs showing example uses of the external accessory of FIG. 2.
Figure 6:
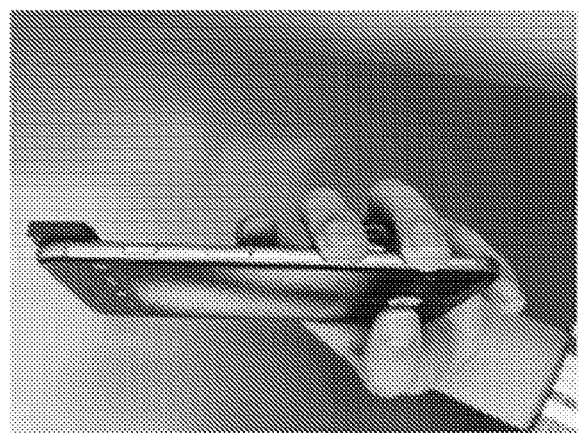
Figure 6:
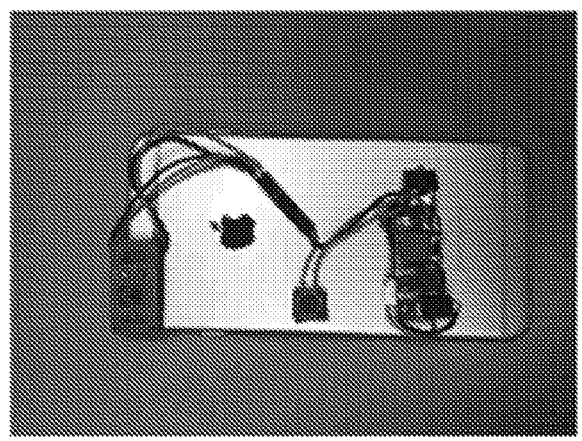

The external attachment device 20 can be small to allow for portable imaging with the mobile device 32. For example, FIG. 5 is a photograph of an example attachment device A (with the components of external attachment device 20) mounted on a MI6 android smartphone B. FIG. 6 is a photograph of an example attachment device A (with the components of external attachment device 20) mounted on an Apple iPhone 6s+ A and the device being used for an imaging operation B. The external attachment device 20 does not remove abilities of the mobile device to act as a bright field microscope. This opens the possibility to create hybrid images showing more features of the sample (e.g., overlaying MUSE images over bright field images).

IV. Methods

Another aspect of the present disclosure can include methods 70-140, as shown in FIGS. 7-14, for employing a compact and low cost external accessory for a mobile device that can excite a sample based on frustrated total internal reflection (FTIR) and this excitement can be used to perform high resolution MUSE imaging. The methods 70-140 can be performed by the system of FIG. 1, as shown and described further in FIGS. 2-6.

The methods 70-140 are illustrated as a process flow diagram with flow chart illustrations. For purposes of simplicity, the methods are shown and described as being executed serially; however, it is to be understood and appreciated that the present disclosure is not limited by the illustrated order, as some steps could occur in different orders and/or concurrently with other steps shown and described herein. Moreover, not all illustrated aspects may be required to implement the methods.

Figure 7:
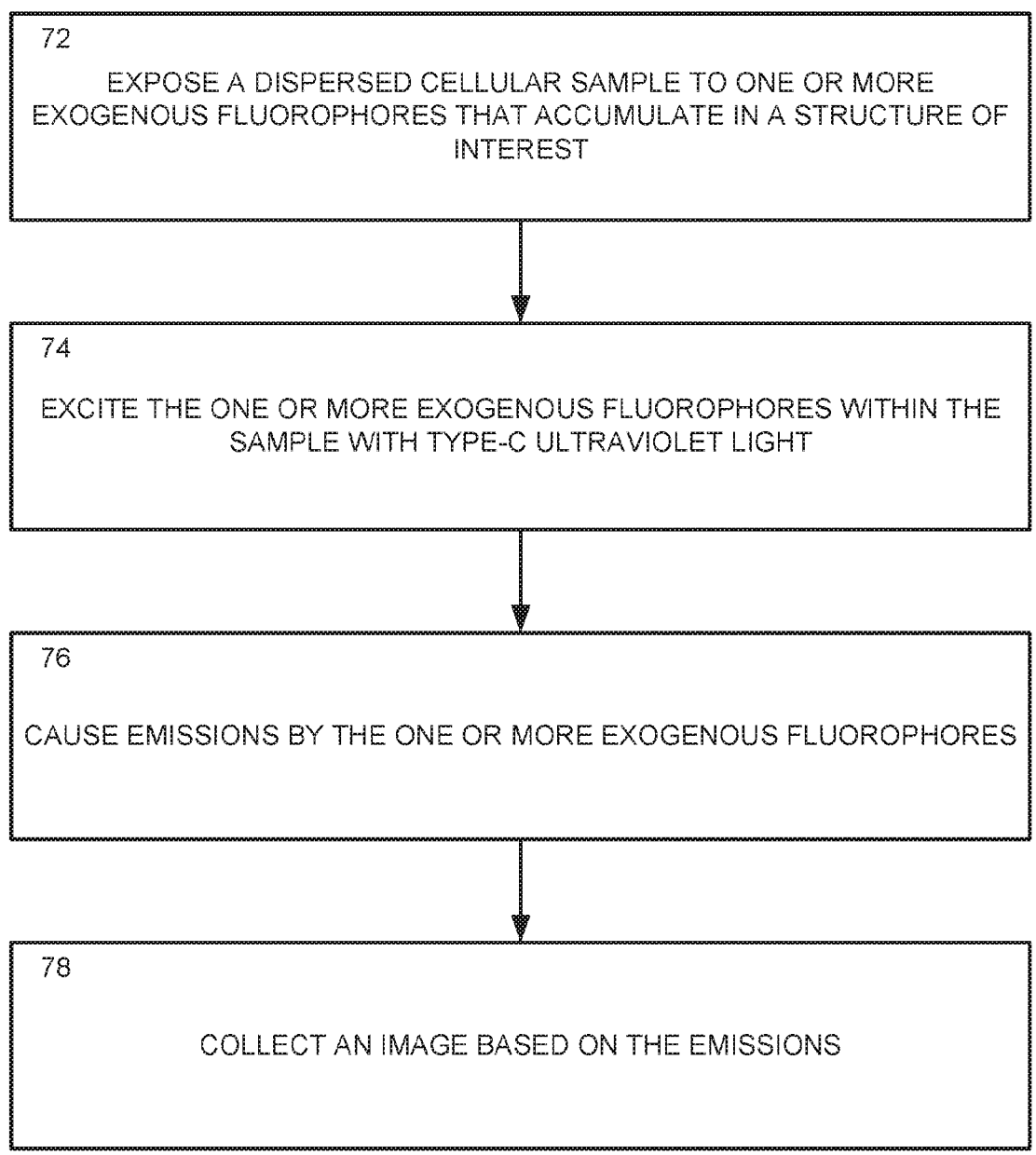
FIG. 7 is a process flow diagram showing an example method for performing MUSE imaging.

Referring now to FIG. 7, illustrated is a method 70 for performing MUSE imaging. The method 70 can be performed by the system 10, shown in FIG. 1. In other instances, the system can be performed by the system 30, shown in FIG. 3 (a mobile device microscope). The systems of FIGS. 1 and 3 can have a digital image sensor 14, 36 and have and/or be connected to a display with a red channel, a green channel, a blue channel, and an opacity channel.

At 72, a dispersed cellular sample (e.g., including a cell suspension, a cytology smear, a bacteria colloidal sample, or the like) can be exposed to one or more exogenous fluorophores and/or fluorescent probes that accumulate in a structure of interest. For example, the one or more fluorophores and/or fluorescent probes can include chemical dyes, quantum dots, proteins, peptides, and/or oligonucleotides.

At 74, the one or more exogenous fluorophores can be excited within the sample with Type-C ultraviolet (UVC) light. The UVC light can be produced by one or more light sources, such as light emitting diode(s) (LED) having a center emission wavelength that causes emission by the one or more exogenous fluorophore and/or fluorescent prove (e.g., a center wavelength from 230 nm to 290 nm). As am example, the one or more exogenous fluorophore and/or fluorescent probe can be excitable in a range of 235 nm to 285 nm with a useful emission band from 350 nm to 700 nm.

At 76, exposure to the UVC light (e.g., at the certain center wavelength) can cause the exogenous fluorophores and/or fluorescent probes to make emissions. At 78, an image can be collected (e.g., by a microscope having one or more digital image sensor, such as a mobile device microscope) based on the emissions. The image can include the excited one or more exogenous fluorophore and/or fluorescent probe. The microscope having one or more digital image sensor, such as a mobile device microscope, can have one or more diffractive optical element attached to the microscope and one or more cameras, each configured to detect at one or more wavelength ranges from 350 nm to 700 nm. For example, the image can be projected into red, green, blue, and opacity channels of a standard display device.

Figure 8:
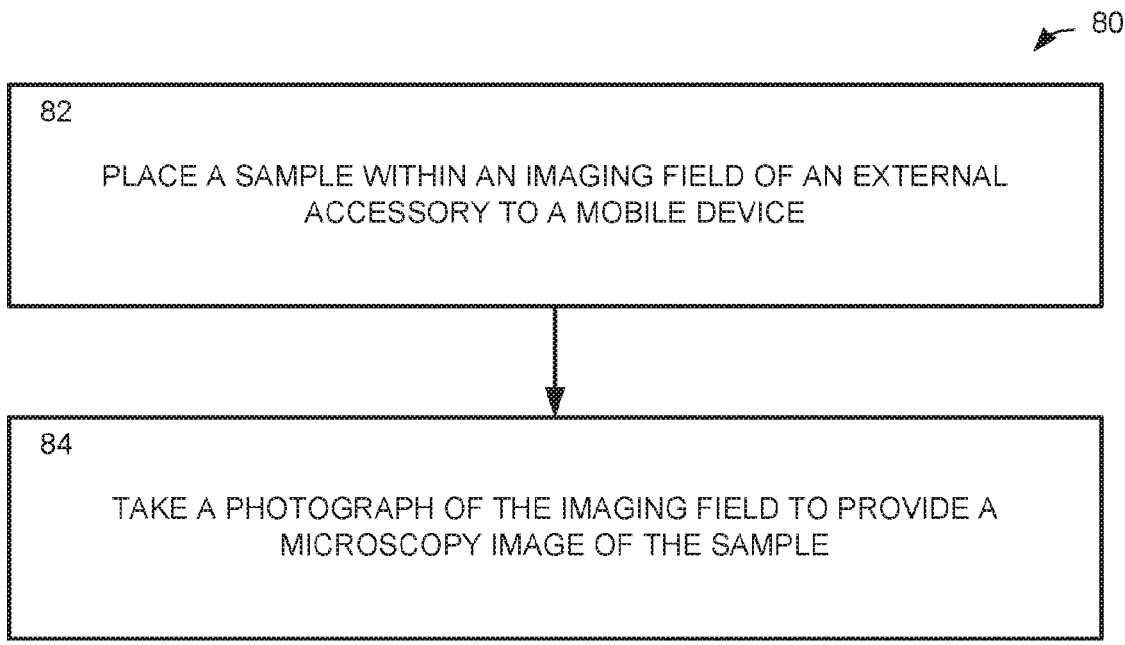
FIG. 8 is a process flow diagram showing an example method for performing mobile device microscopy with an external accessory.

Referring now to FIG. 8, illustrated is method 80 for performing mobile device microscopy with an external accessory (e.g., external accessory 20 attached to mobile device 32). At 82, a sample (e.g. sample 38, which may be stained and held in place by liquid 39) can be placed within an imaging field of an external accessory (e.g., external accessory 20) to a mobile device (e.g., mobile device 32). At 74, a photograph of the imaging field (of the external accessory 20) can be taken (e.g., by the mobile device with an integrated photographic camera) to provide a microscopy image of the sample (e.g., a MUSE microscopy image of the sample 38).

Figure 9:
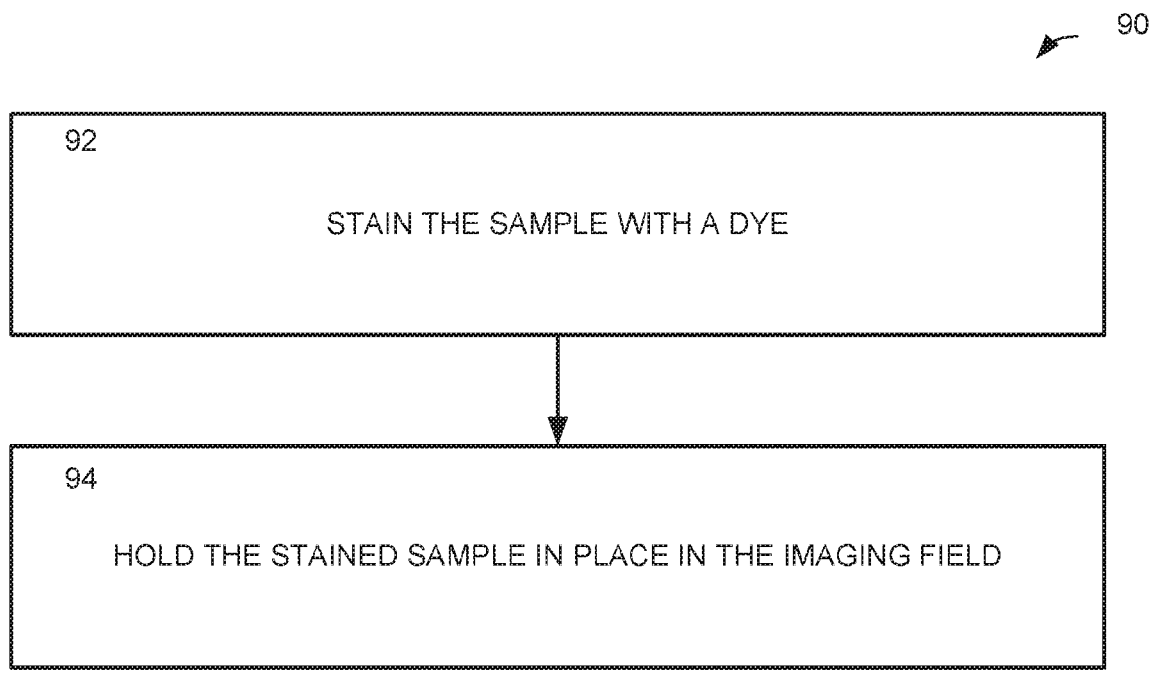
FIG. 9 is a process flow diagram showing an example method for staining a sample for mobile device microscopy.

FIG. 9 shows a method 90 for staining a sample for mobile device microscopy (as described with respect to FIG. 8). At 92, the sample (e.g., sample 38, which can be a biological sample) can be stained with a dye (e.g., that is excitable by UVC light). For example, the dye can be a fluorescent histology dye. The fluorescent histology dye can be dissolved in a first solvent (e.g., one or more of water, methanol, ethanol, isopropanol, acetone, xylene, etc.). The first solvent can be absorbed with a first piece of absorbent material, which can be dried in a container. The first piece of absorbent material and a second piece of absorbent material can be wetted with a second solvent (e.g., one or more of water, methanol, ethanol, isopropanol, acetone, xylene, etc.). The second solvent may be the same as the first solvent, but need not be the same as the first solvent. The sample can be contacted with the first piece of absorbent material and then the second piece of absorbent material to stain the sample. The surface tension from residual liquid on the sample holds the sample in place within the imaging field. The first piece of absorbent material and/or the second piece of absorbent material can be made using at least one of paper, cotton, sponge, a synthetic polymer, or the like. At 94, the stained sample can be held in place in the imaging field (e.g., of the external accessory 20).

Figure 10:
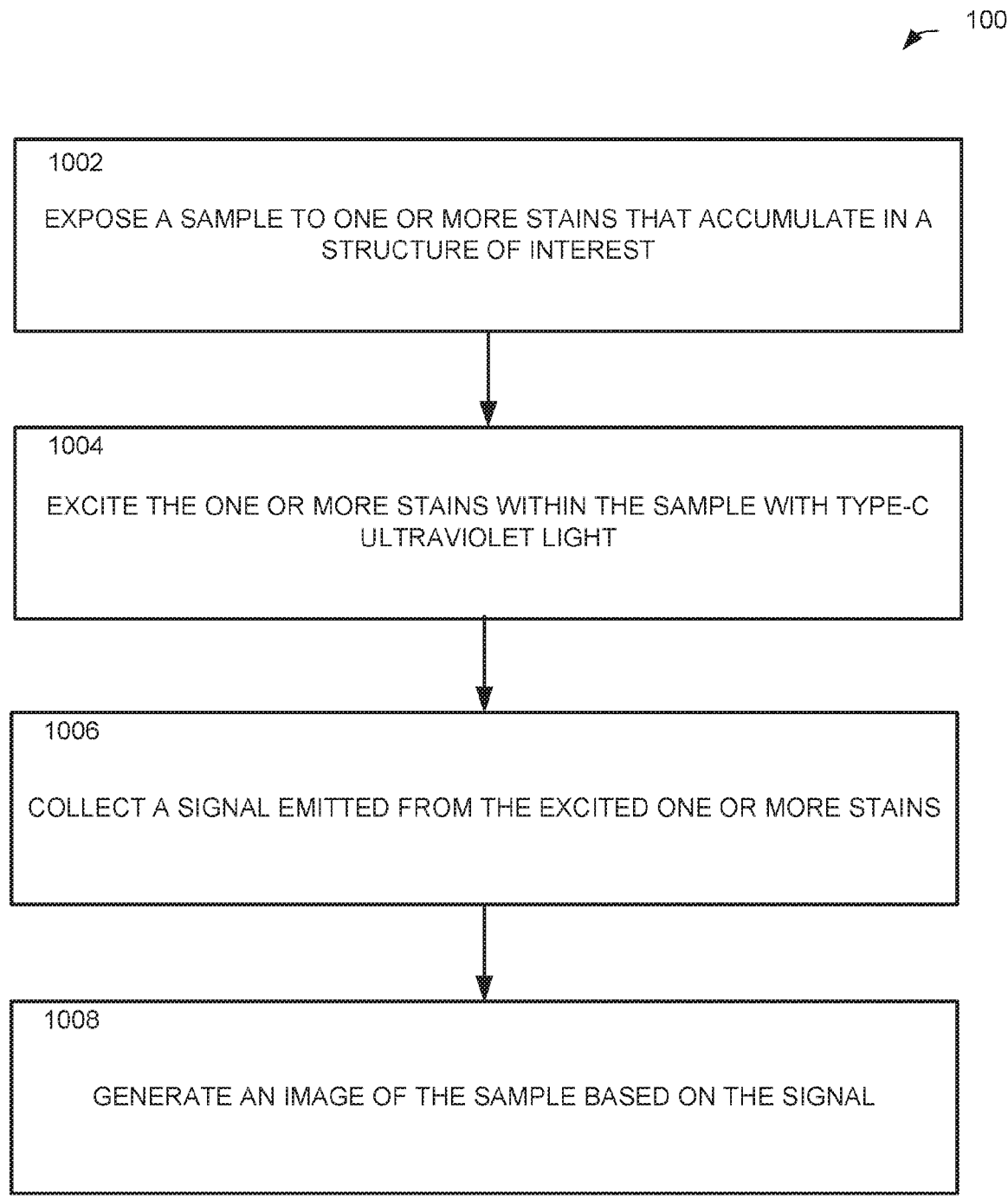
FIG. 10 is a process flow diagram of an example method for performing mobile device microscopy with an external accessory of a stained sample.

Referring now to FIG. 10, illustrated is a method 100 for performing mobile device microscopy with an external accessory (e.g., external accessory 20 attached to mobile device 32) of a stained sample (e.g., stained according to the method 90). At 1002, a sample can be exposed to one or more stains that accumulate in a structure of interest. At 1004, the one or more stains within the sample can be excited with type-C ultraviolet (UVC) light. At 1006, a signal emitted from the one or more stains can be collected (as shown in FIGS. 3 and 4). At 1008, an image of the sample can be generated (e.g., by a processor of mobile device 32) based on the signal.

Figure 11:
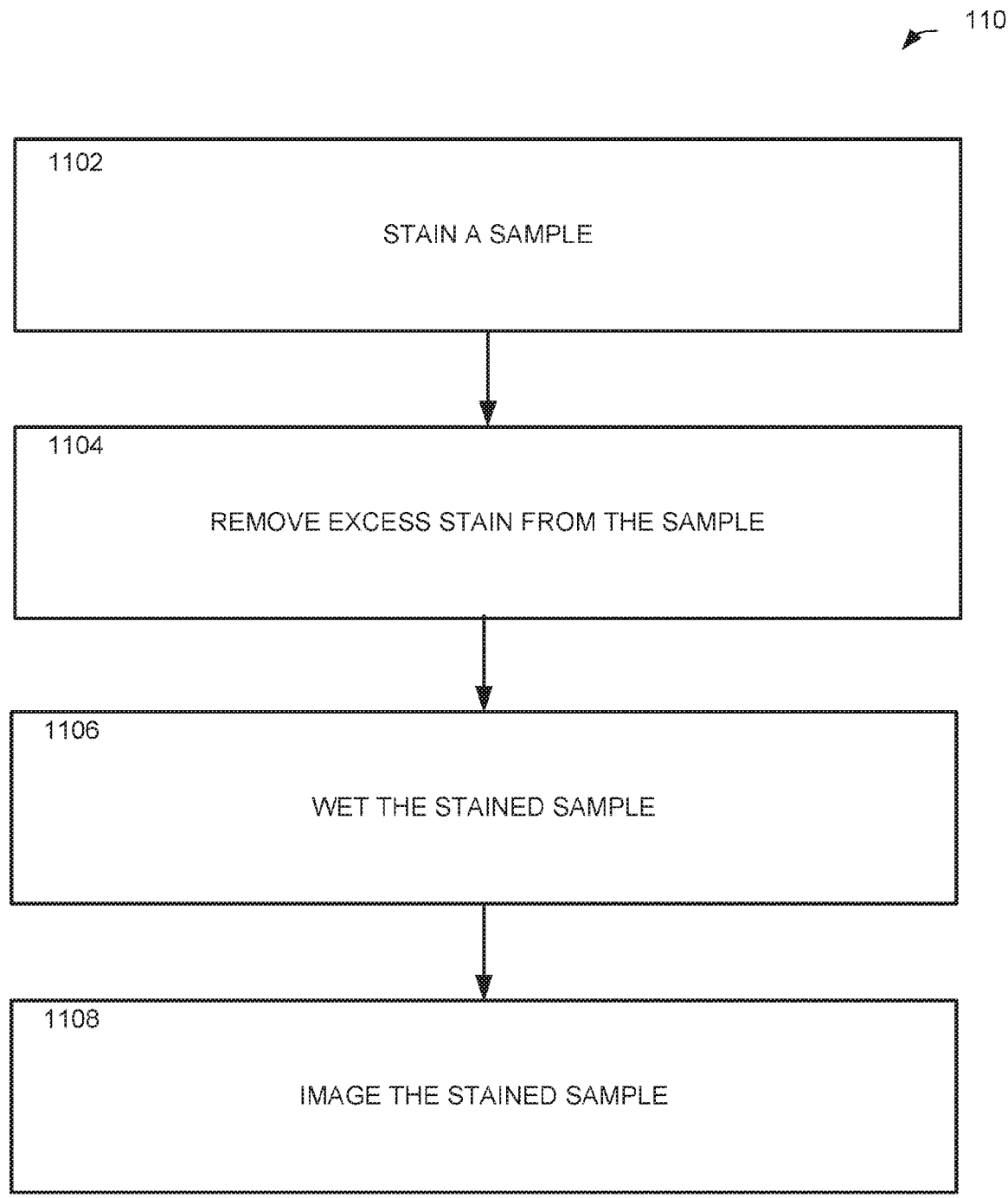
FIG. 11 is a process flow diagram of an example method for imaging a sample containing cells.

Shown in FIG. 11 is a method 110 for imaging a sample (e.g., a tissue sample for a biopsy). At 1102, the sample is stained. The staining can occur after the sample is cut into a desired size (e.g., manually). The stain can include a dye mixture that can include a nucleic acid dye, a fluorescent counterstain, and a non-fluorescent dark dye. As an example, the stain can include DAPI (4',6-diamidino-2-phenylindole, a fluorescent stain), rhodamine, and light-green SF or other types of green dye or triarylmethylene dye. The stain can be dissolved in 20%-70% alcohol (e.g., methanol, ethanol, or the like) solution. At 1104, excess stain is removed from the sample. The excess stain is blotted using an absorptive material, for example. Use of the fluorescent dark dye eliminates the need for the washing process required by the original MUSE protocol, so a source of clean water is not required by the method 110. At 1106, the stained sample is wetted again (e.g., in water) and at 1108, the stained sample is imaged directly (e.g., using the microscope 10 or the microscope 30).

Plant, fungus, algae, and/or micro-animal samples can be imaged in the same way as the method 110. For example, some plant sample can be imaged directly with intrinsic fluorescence. Indeed, cell wall and large subcellular structure can be easily visualized using the method 110. All plants can be processed similarly to the tissue samples mentioned above, using dyes with different affinity to different plant structures. For example, DAPI, originally used as a cell nuclei stain is also a great option for plant cell walls. Both fluorescing and absorbing dyes can be used for this purpose. Special stains such as iodine can be used to stain starch, which creates a dark contrast. The method 110 can be used to visualize plant structures and diagnose potential plant diseases.

Figure 12:
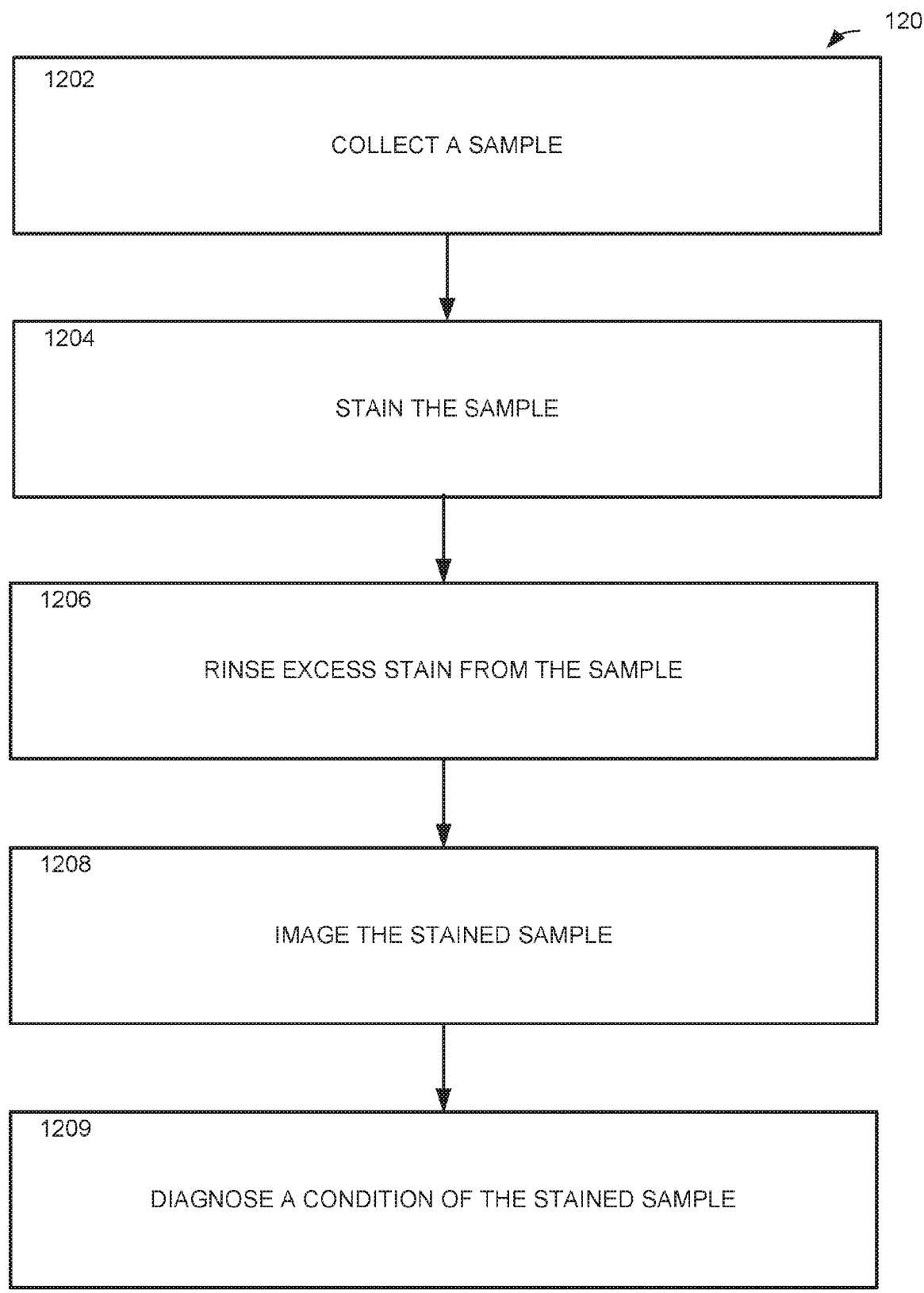
FIG. 12 is a process flow diagram of an example method for imaging a sample with sparse cells.

Referring now to FIG. 12, illustrated is a method 120 for imaging sparse cell samples (e.g., a buccal smear, a pap smear, or the like). At 1202, a sample can be collected. For example, the sample can be a sparse cell sample. In some instances, the sample can be collected using a cotton swab by swabbing a mucosal membrane. At 1204, the sample can be stained (e.g., with a dye mixture similar to that described with respect to the methods 700-110). At 1206, excess stain can be rinsed from the sample (e.g., with tap water or clear/distilled/pure water). At 1208, the stained sample can be imaged. For example, the sample can be imaged directly on the cotton swab tip by holding the tip directly against the microscope (an imaging surface near or on the objective lens, for example). As another example, the stained sample can be smeared onto an imaging surface near or on the objective lens. At 1209, a condition of the stained sample can be diagnosed. The condition, as an example, can be a disease that can be diagnosed based on the morphology of mucosal cell lesions and/or microorganisms.

Figure 13:
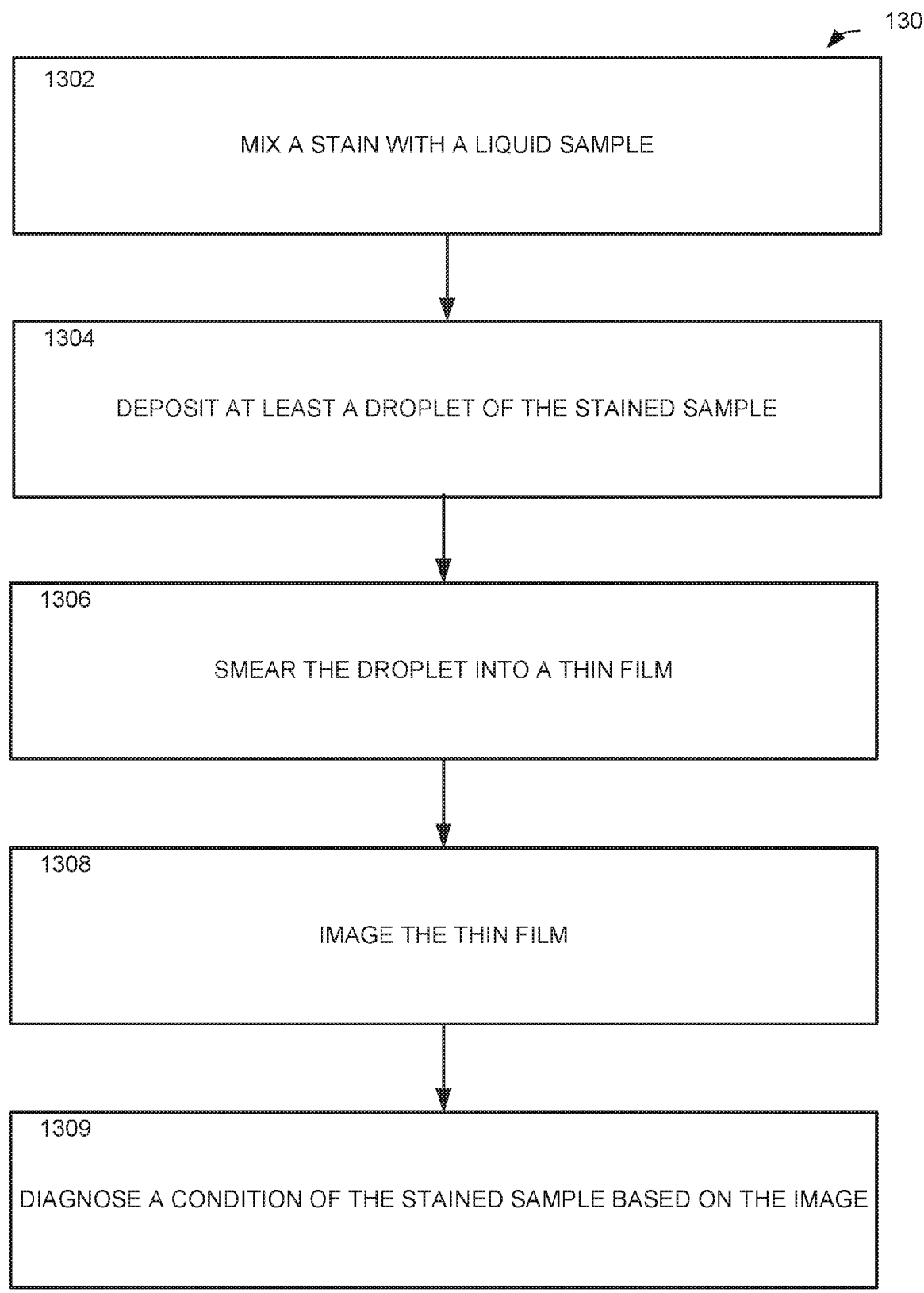
FIG. 13 is a process flow diagram of an example method for detecting a microorganism in a fluid.

FIG. 13 shows a method 130 for diagnosing a condition of a liquid sample. The liquid sample can be from the body (e.g., blood, sputum, etc.), food, the environment, or the like. The condition can be related to the presence of a microorganism, such as a bacterium.

At 1302, a stain can be mixed with a liquid sample. For example, the stain can include one or more fluorescent dyes, such as acridine orange, Hoechst, DAPI, etc. At 1304, at least a droplet of the stained sample can be deposited (e.g., on the microscope on or near the objective lens). At 1306, the deposited droplet can be smeared into a thin film. At 1308, the thin film can be imaged by the microscope (e.g., microscope 10, microscope 30, or the like). At 1309, a condition of the stained sample can be diagnosed based on the image. For example, bright spots can be characterized by their morphology and emission profile. Alternatively, test paper with pre-absorbed dyes can be used. In this case, the test paper is exposed to the test paper and the surface of the sample can be imaged directly with the microscope.

To differentiate Gram positive and negative bacteria: a fluorescent probe (different color from the first stain) conjugated to wheat grain arginine (WGA) can be added to the sample to detect gram negative bacteria, while gram positive bacteria can be stained by WGA.

To differentiate living and dead microorganisms in the solution, a membrane permeable nucleic acid dye can be mixed with a membrane impermeable dye (e.g., propidium iodide). The dead microorganisms can be detected in red-orange color.

To detect a certain bacteria species, a species specific fluorescent label can be mixed with the sample, and the mixed sample can be imaged. A fluorescent speckle would mean the presence of the microorganism. The sensitively of these methods are at about 1 bacterium/microliter. At lower concentration, bacteria samples can be cultured and concentrated in a liquid phase culture.

For example, to detect tuberculosis bacteria in sputum, the sputum sample can be collected with a cotton swab. The septum sample can be dried, heat fixed, and stained in place with auramine-rhodamine. The dye can be washed off with an acid/alcohol decolorizer. The tip of the cotton swab can be imaged for bright spots (that correspond to tuberculosis bacteria).

Figure 14:
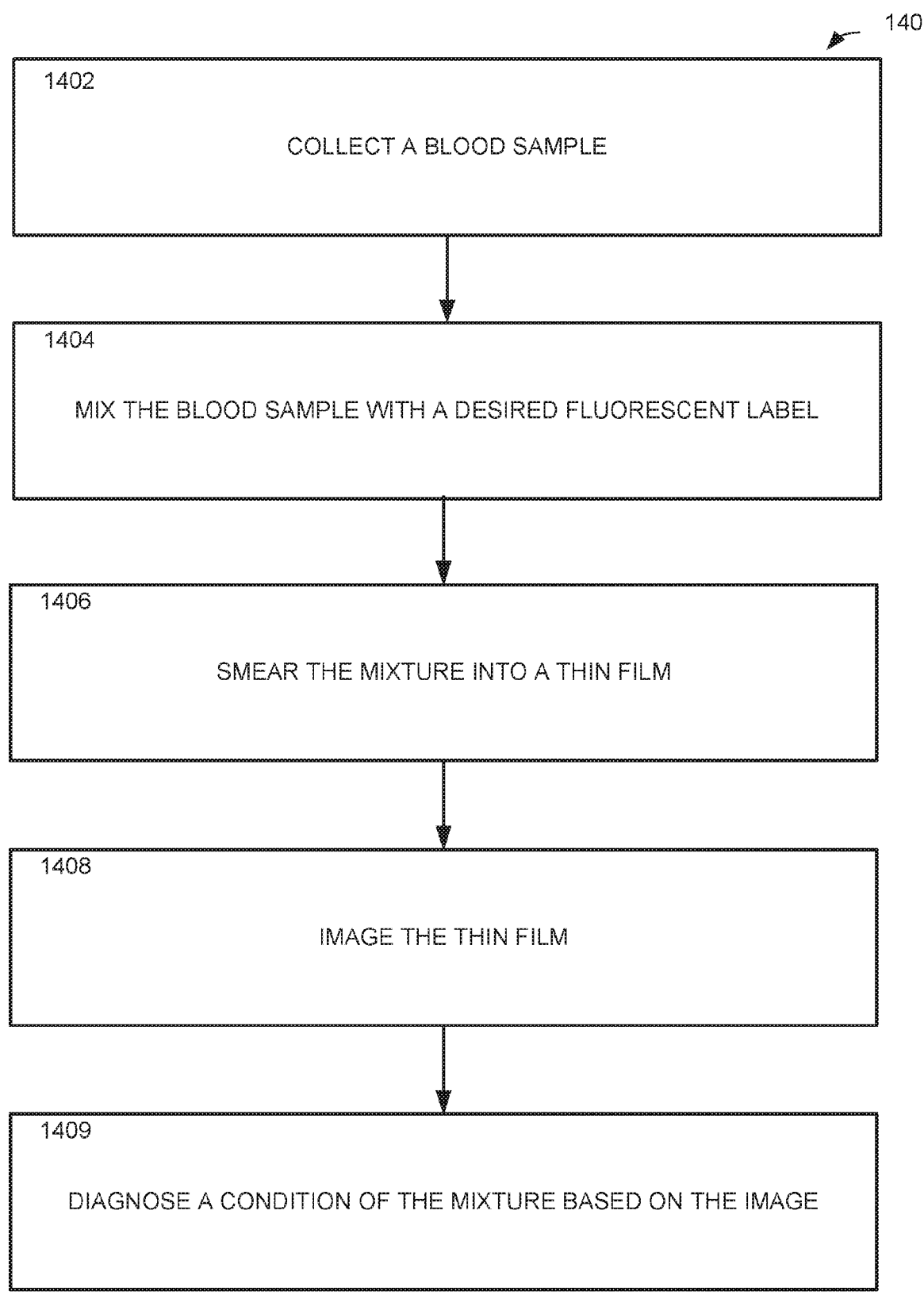
FIG. 14 is a process flow diagram of an example method for detecting a blood borne parasite.

FIG. 14 shows a method 140 for diagnosing a condition of a blood sample. The condition can be, for example, caused by the presence of a blood borne pathogen and/or parasite (e.g., African trypanosomiasis, babesiosis, Chagas disease, leishmaniasis, malaria, toxoplasmosis, or the like). At 1402, a blood sample can be collected and at 1404, the blood sample can be mixed with a desired fluorescent label (or stain). The desired fluorescent label can be chosen based on the pathogen and/or parasite whose presence is being investigated. For example, the label can specifically interact with the pathogen and/or parasite whose presence is being investigated to enable diagnosis of the condition.

At 1406, the mixture can be smeared (e.g., onto the microscope on or near the objective lens). At 1408, the mixture can be imaged directly (e.g., using microscope 10, microscope 30, or the like). At 1409, a condition of the mixture can be diagnosed based on the image.

At high pathogen and/or parasite concentrations, the pathogens and/or parasites can be visualized directly. At low pathogen and/or parasite concentration, the blood sample can be centrifuged first (e.g., using a low cost paper centrifuge). Bright-field imaging can be used to detect red blood cells, and fluorescence emission can be used to detect concentrated nucleic acid, which are accumulated in parasites and white blood cells. Parasites and white blood cells can be differentiated by their morphologies (e.g., size) and locations (e.g., inside red blood cell). Hybrid imaging (bright field plus MUSE simultaneously) can be implemented for these type of tests.

V. Experimental

The following example shows the use of an example of Microscopy with Ultraviolet Surface Excitation (MUSE) imaging implemented on a mobile device. The following example is for the purpose of illustration only and is not intended to limit the appended claims.

Materials and Methods

Fabrication

Figure 15:
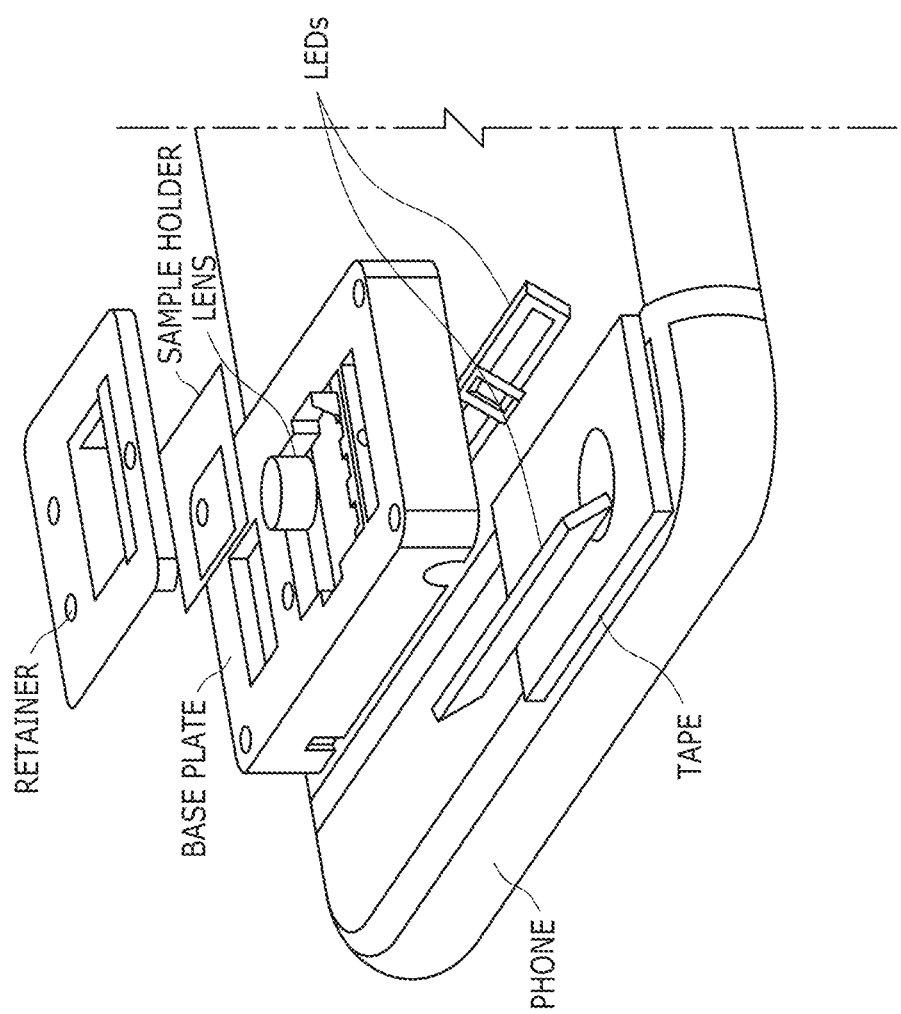
FIG. 15 is an exploded schematic showing the major components of Pocket MUSE.

Aspheric compound lenses, 285-nm LEDs, fused silica optical windows and other general supplies were purchased from various online vendors and modified as follows: 1. aspheric compound lenses were gently removed from the aftermarket replacement cameras using plastic tweezers; 2. quartz windows of the LEDs were removed using a razor blade and the height of the LED packaging was further reduced to ~1 mm (from ~1.25 mm) by manual sanding with a file (180 Grit); 3. fused silica optical windows were cut into ~10×10 mm$^2$ squares using a diamond scribe, with two opposite edges polished sequentially using 40/30/12/9/3/1/0.3 μm grade lapping films. The base plate and the sample holder retainer were designed with Solidworks, and 3D printed with polylactide using an FDM printer (Snapmaker). The modified LEDs were soldered on customized printed circuit board (PCB) adaptors (designed with Autodesk EAGLE, fabricated by OSHPark.com). The LEDs were wired to a DC up-regulator with a push button switch in between. The components were assembled as shown in FIG. 15.

Alignment

An easy and robust alignment procedure was developed to tolerate the limited accuracy of inexpensive components (e.g., 3D printing and optical window thickness) and allow nonprofessionals to align the system. It is critical to align the sample holder to the focal plane of the reversed aspheric compound lens (RACL). To tolerate variations from the manufacturing process, the base plate is designed to be slightly thicker, so the focal plane of the RACL offsets ~150 μm below the sample surface. Alignment of Pocket MUSE is an iterative process where the baseplate surface facing the smartphone is sanded with 1000-3000 grit sandpaper until the sample surface is in focus. Taking advantage of the focus adjustment function of smartphone cameras, the focal plane of the microscope can swing by tens of microns, reducing the accuracy needed from the sanding step. The thickness of the base plate (measured with a caliper) and alignment of the system (evaluated qualitatively by image sharpness) is verified regularly (e.g., every ~30 μm) until good alignment is achieved.

Imaging

The Pocket MUSE component is mounted onto the smartphone with double sided tape. The DC up-regulator is either connected to the smartphone USB outlet (for Android phones), Lightning outlet (for iPhones, with an On-The-Go (OTG) converter) or an external battery. After samples are loaded on the sample holder by surface tension, microscopy images can be taken directly with the default smartphone camera apps. For advanced controls of imaging parameters (e.g., ISO (gain), exposure time, focus, output format, etc.), it is helpful to use third-party or customized camera apps (e.g., Halide). For MUSE imaging, UV illumination should be enabled with the push button switch before the focus and exposure adjustments. Exposure time varies between 10 ms and 1 s depending on the sample type and dye concentration. Smaller ISO (gain) is desired for better signal to noise ratio. To prevent background light, external lights can be dimmed or aluminum foil can be used to cover the microscope. Bright-field transillumination is achieved by facing the smartphone towards a white scattering surface (e.g., white wall, printing paper, etc.). Instability by hand is usually well tolerated because relative sample motion with respect to the smartphone is extremely small, especially for exposure times shorter than 250 ms.

Data Processing

Unlike scientific cameras, smartphone camera apps usually automatically process raw image data and save the data as 24-bit RGB color images. Therefore, data processing (e.g., white balance, digital filters, etc.) can take place even before (e.g., in preview mode) an image is acquired. Although it is difficult to determine the actual data processing algorithm performed by different smartphones, such information is not required for most Pocket MUSE applications. Still, it is possible to use third-party camera apps (e.g., Halide on iOS and ProCam on Android) to save raw (unprocessed) image data, which is especially beneficial when extended dynamic range, lossless data, and advanced processing are needed. To visualize camera raw data, it is necessary to first convert the data (e.g., DNG file) into 24-bit RGB formats (e.g., TIFF). Data conversion can be performed with software such as Adobe Camera Raw (in Photoshop) and RawTherapee (in GIMP). These programs are commonly used for non-scientific photo editing, so they could be easily adapted by non-professional users.

Whole Mount Samples

Excised mouse tissue was obtained from unrelated studies with IACUC approval. The tissue was either used fresh directly following dissection, or fixed in 4% paraformaldehyde overnight and stored in 1× phosphate buffered saline (PBS) at 4° C. Other animal and plant samples were collected from the subject's kitchen (e.g., vegetables, meat, etc.), university campus (e.g., algae, pine needles, etc.) and backyard (e.g., garden plants, roundworms, etc.). All samples were manually cut or torn with tweezers into smaller pieces (<3×6×3 mm$^3$). For each sample, at least one relatively flat imaging surface is created. Staining solutions were prepared by dissolving dyes in 30-70% v/v alcohol. One commonly used staining solution in this study is 0.05% w/v rhodamine B and 0.01% w/v DAPI in 50% v/v methanol, which was used for most histology samples and some plant samples. The sample is immersed in the staining solution for 5-20 s, rinsed with tap water and briefly dried with an absorbent material (e.g., tissue paper). Pseudo H&E color mapping was performed using the method described previously.

For the IHC staining demonstration, a piece of fixed Thy1-GFP (Jackson Laboratory, CAT #011070) mouse brain slice (500-μm thick) was obtained from unrelated studies with IACUC approval. A universal buffer (e.g., for blocking, staining and washing) containing 3% v/w bovine serum albumin, 1% v/w Triton X-100, 0.05% v/w sodium azide and 1×PBS was prepared ahead of time. For blocking, the brain slice was first incubated in an excess amount of the universal buffer for ~2 h at 37° C. For whole-mount staining, the blocking buffer was then replaced with 500 μL fresh universal buffer containing 1% v/v GFP Polyclonal Antibody (Alexa Fluor 488 conjugate, Thermo Fisher Scientific, CAT #A-21311) and 0.05% w/v propidium iodide. The sample was shaken at 37° C. for 16 hours. After staining, the sample was washed again in an excess amount of the universal buffer for ~2 h at 37° C., followed by a 30 min wash in PBS. Channel unmixing was performed using ImageJ.

Cytology Samples

Blood samples were collected from a subject with a consumer lancing device (for blood glucose monitoring). The experiment was determined as a non-human subject research project by Case Western Reserve University's Internal Review Board (IRB) and was conducted under the consent of the subject who provided the sample. 100 µL of blood was mixed in 100 µL PBS containing 4 mM ethylenediaminetetraacetic acid and 0.01% w/v sodium azide. For nuclei staining, 10 µL of the blood sample was mixed with 1 µL of 0.1% w/v acridine orange in 50% v/v methanol. For dense blood smear imaging, 1 µL of the stained sample was dropped on the sample holder and air dried prior to imaging. For thin blood smear imaging, the stained sample was further diluted 10 times with PBS prior to imaging. Similarly, cheek swab samples were collected from one subject using consumer cotton swabs. The experiment was also determined as a non-human subject research project by the university's IRB and was conducted under the consent of the subject who provided the sample. After swabbing the inner surface of the cheek, the cotton swab was dipped in a staining solution containing 10% v/v CytoStain (Richard-Allan Scientific) and 0.01% w/v propidium iodide for 5 s. The cotton swab was then briefly rinsed with tap water and dried with an absorbent material. The stained cell lesions were either imaged after being smeared on the sample holder surface, or directly on the cotton swab.

Bacteria Samples

To test non-specific bacterial labeling, a random mixture of bacteria was collected from the supernatant of a mouse tissue specimen that was improperly stored in non-sterile PBS at 4° C. for 6 months. The sample was diluted 10 times with PBS, and 100 µL of the sample was mixed with 10 µL of 0.1% w/v acridine orange in 50% v/v methanol. 2.5 µL of the mixture was dispensed on the Pocket MUSE sample holder and the aliquot was imaged directly with Pocket MUSE. To test Gram-specific bacterial labeling, *Escherichia coli* (*E. coli*) was generously provided from an unrelated study. *Bacillus subtilis* (Ehrenberg) Cohn (*B. subtilis*) was ordered from American Type Culture Collection (ATCC, CAT #23857). Both bacteria were cultured in lysogeny broth overnight at room temperature. For the experiment, 4 samples were prepared as follows: 1. 500 µL PBS as a control; 2. 100 µL *E. coli* culture in 400 µL PBS; 3. 100 µL *B. subtilis* culture in 400 µL PBS; 4. 50 µL *E. coli* culture and 50 µL *B. subtilis* culture in 400 ∞L PBS. Each sample was mixed with a 100 µL staining solution, containing 0.05% w/v DAPI and 0.1% w/v WGA-AF594 in 50% methanol. 2.5 µL of each mixture was imaged with Pocket MUSE with the same camera configuration. Distribution of pixel values was plotted using Matlab.

Results

Overview of Pocket MUSE Design and Operation

To ensure low cost and ease of production, Pocket MUSE features a simple design while maintaining the ability to obtain high-quality images. It consists of only 4 major components: an objective lens, a sample holder, UV LED light sources and a base plate (FIG. 15). A reversed aspheric compound lens (RACL) serves as the proximal optical element, centered immediately in front of the smartphone camera, and provides a relatively wide field of view (FOW) of ~1.5×1.5 µm². The sample holder, a 0.5 mm-thick quartz optical window, has its top surface pre-aligned with the focal plane of the objective lens. This eliminated the need for fine coarse focusing mechanics that are essential for traditional microscope designs. The required fine focusing is performed via smartphone camera focus adjustment. The sample holder also serves as a waveguide for the frustrated TIR illumination. The light sources, two miniature 275-285 nm UV LEDs, are powered directly with the smartphone battery via the USB port through a step-up regulator. All the components are integrated in an ultra-compact base plate, designed to be 3D printable using simple fused-deposition modeling (FDM), utilizing <2 g of material.

By eliminating all adjustment mechanisms, even first-time users can easily operate Pocket MUSE. To image, samples (tissue or fluid) are attached to the sample holder by surface tension. As the sample holder is pre-aligned to the focal plane of the objective, the sample is always in focus during normal operation. In addition, similar to conventional smartphone photography, Pocket MUSE is designed to take quality images while holding the phone with one hand. This provides extra convenience for applications in the field, where a stable working bench is not always available. After imaging, the sample holder can be easily cleaned using cotton swabs and common solvents (e.g., 70% isopropanol). For heavy duty cleaning or sterilization, the sample holder can also be detached from the device.

Objective Lens Selection

The microscope compartment of Pocket MUSE is improved over previous RACL smartphone microscope designs. In an early-phase implementation, the RACL design delivered good resolution and a large FOV while maintaining relatively low cost (lens cost<$10). The principle behind this design is simple and robust. Because smartphone camera lenses are capable of telecentric imaging, stacking a pair of such lenses face-to-face creates 1:1 finite image conjugation (object size:image size) between their back focal planes, corresponding to the object plane (sample surface) and the image plane (sensor surface) of the microscope. However, this original design had a critical limitation. While a common smartphone camera lens often has f-numbers around 1.5-2.4 (corresponding to a numerical aperture of ~0.2-0.3), and provides ~1-2-µm optical resolution, the actual resolution is pixel-limited because a typical smartphone camera sensor often has a pixel size of ~1.5-2 µm. The pixels are grouped in 2×2 as part of RGB Bayer filter configuration, further reducing the effective pixel size to ~3-4 µm.

Improving the resolution of previous RACL designs would further expand the capabilities and potential applications for smartphone microscopes. The original RACL manuscript suggested that a smartphone with a large sensor and small pixel size (e.g., Nokia 808) can help improve the effective resolution 10. However, it is not a universal solution for most smartphones. Here, the effective resolution of the RACL design can be further improved using a smaller RACL with a shorter focal length (e.g., <1.5 mm). Through Zemax optical simulation, it was confirmed that a smaller RACL can effectively reduce the image conjugation ratio (e.g., from 1:1 to 1:2) while maintaining good optical performance over a >1 mm FOV. While preserving optical resolution, the smaller RACL increases the magnification of the system, and in turn, boosts the effective resolution through denser spatial sampling when projected onto the cellphone camera sensor. As the simulation did not take into account the specific optics and sensor size for each smartphone, a wide range of lens samples were obtained from aftermarket consumer products and tested them with different smartphones. Among the lenses tested, 1 µm effective resolution and 1.5×1.5 mm² FOV can be achieved using a smaller RACL designed for ⅐" image sensors. By comparison, this optical design greatly outperforms a conventional benchtop microscope with a high quality 10× objective. Therefore, these lenses were chosen for the Pocket MUSE design.

Frustrated TIR Illumination

A smaller RACL often has a large entrance aperture (>3 mm diameter) and a short working distance (<1 mm). Within this narrow working distance, it is necessary to fit a sample holder (optical window). Because conventional sub 285 nm UV LEDs often have package sizes (3.5×3.5×1 mm$^3$) that are even larger than the RACL, implementing the original MUSE illumination configuration becomes nearly impossible due to limited spatial clearance. To overcome this problem, frustrated TIR was identified as an effective approach to deliver light to the sample surface. In the configuration, LED-based sub 285 nm UV illumination is coupled into the sample holder (a 0.5 mm thick quartz optical window) from the side faces of the optical window. Above the glass-air critical angle, the coupled light bounces between the two glass surfaces through TIR. When a sample is present, the glass-air interface turns into a glass-sample (glass-water) interface. It changes the TIR critical angle and allows some light to refract out of the glass, facilitating sample illumination. In addition, the TIR illumination was further optimized by implementing two LEDs. Because a significant amount of light is absorbed by sample regions closer to the LED, a single LED could not effectively illuminate the entire FOV. Through optics-based simulation, a >50% energy drop across 2 millimeters of sample was noted, causing significantly non-uniform illumination. To compensate for this drop, another LED was added on the opposite edge of the optical window. Through both modeling and experiments, it was shown that relatively uniform illumination (<±10% variation across 3 mm) can be achieved with the dual-LED setup.

Histology Imaging

Figure 16:
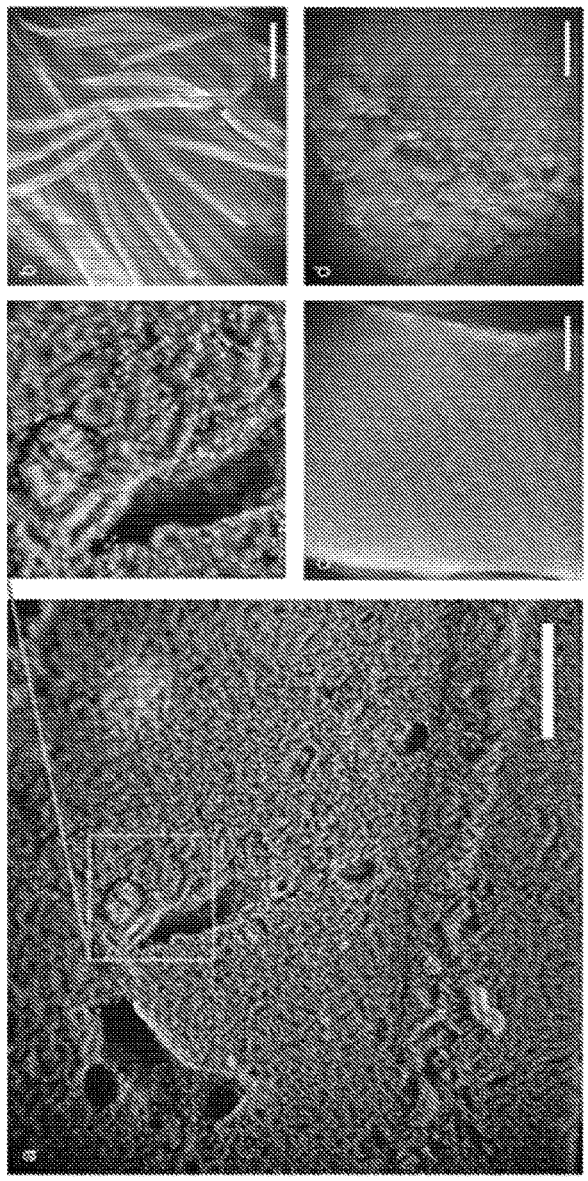
FIG. 16 shows histology images acquired with Pocket MUSE.
Figure 17:
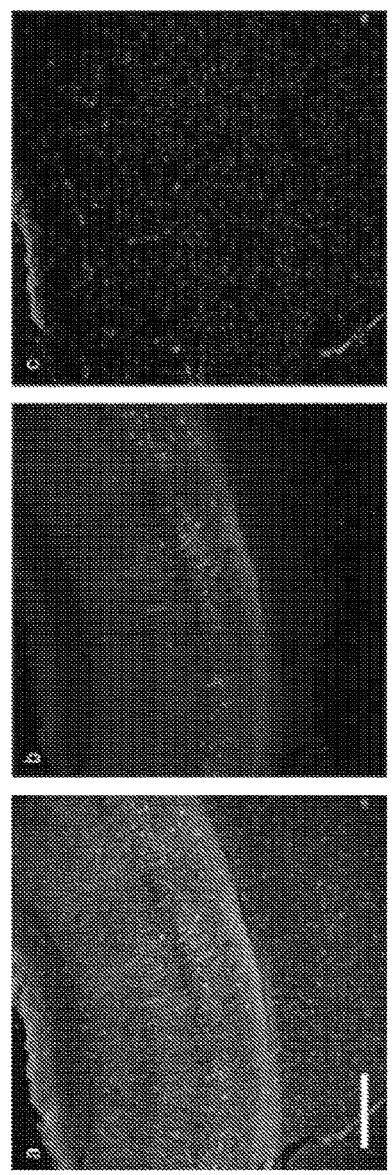
FIG. 17 shows images of a 500 µm thick Thy2-GFP brain slice acquired with Pocket MUSE.

Slide-free histology is one of the most well-established MUSE applications. Therefore, as the first demonstration, Pocket MUSE is shown to be fully capable of producing high quality histology images similar to those acquired from benchtop MUSE systems. With a single-dip staining process followed by brief tap-water washing, high image contrast was achieved on a large variety of tissue samples (e.g., kidney, muscle, etc.) within minutes (FIG. 16, elements a-d; all samples were stained with 0.05% w/v Rhodamine B and 0.01% w/v DAPI unless otherwise specified. a) Image of a thick section of mouse kidney sliced with a razor blade. A close-up view of the region in the white box (box size: 320×320 µm$^2$) is shown on the right. b) Image of a piece of mouse skeletal muscle torn with tweezers. c) Image of the serosal surface of a piece of mouse small intestine. d) Image of a piece of salmon steak sliced with a kitchen knife. e) Image of a thick section of mouse liver sliced with a razor blade). In addition, Pocket MUSE provides a similar FOV compared to a conventional 10× objective (e.g., ~1.5×1.5 mm$^2$). With sufficient resolution to resolve individual cell nuclei, it is readily useful for a number of histology-centered applications. Using images captured from Pocket MUSE, it was also possible to implement the color remapping technique described in to generate histology images mimicking the color contrast of conventional H&E staining. Conventional fluorescence immunohistochemistry (IHC) stained tissue can also be imaged with Pocket MUSE (FIG. 17, element a (RGB image acquired with Pocket MUSE)). The sample was stained with anti-GFP antibody (Alexa Fluor 488 conjugate) and propidium iodide. Scale bar: 300 µm). With overnight staining at a slightly higher concentration, fluorophore conjugated antibodies can provide sufficient contrast between the structures of interest and the background fluorescence. Common cell nuclei dyes (e.g., DAPI, propidium iodide, etc.) could also be easily incorporated in the IHC staining process. Different labels can be readily separated by unmixing the RGB channels (FIG. 17, elements b (Alexa Fluor 488 signal (from thy1-GFP) unmixed from the green channel, showing Thy1 positive neurons) and c (Propidium iodide signal unmixed from the red channel of the RGB image, showing cell nuclei)). The sample was stained with anti-GFP antibody (Alexa Fluor 488 conjugate) and propidium iodide. Scale bar: 300 µm).

Plants and Environmental Sample Imaging

Pocket MUSE is also a promising tool for imaging various plants (e.g., vegetables, algae, etc.) and environmental samples (e.g., micro-animals, synthetic pollutants, etc.). Many samples (e.g., cilantro, micro-plastic particles, etc.) are intrinsically fluorescent when excited around 265-285 nm. These samples are capable of generating structural contrast without any staining. Compared to conventional bright-field imaging, Pocket MUSE reveals more of the cellular morphology in bulk plant structures. As with animal tissues, plant tissue could also be stained to produce additional micro-structural contrast with a single dip staining process. For instance, DAPI effectively labels polysaccharides moieties (found in, e.g., cell walls, root saps and starch) in addition to cell nuclei, while rhodamine demonstrates accumulation in the xylem. It was also observed that some absorptive staining (e.g., iodine-stained starch) could be effectively incorporated with fluorescent stains to create additional color contrast between different plant structures.

Bright-Field and Hybrid Imaging

Pocket MUSE can also easily acquire bright-field images when UV illumination is not enabled. This provides a simple and effective method for visualizing naturally colored thin samples (e.g., blood smears). A conventional fluorescence microscope requires switching the filter cube to an open setting for bright-field microscopy which is difficult in a compact smartphone microscope. Because Pocket MUSE does not rely on filters, no mechanical switching is required to change between fluorescence and bright-field imaging. Trans-illumination bright-field microscopy can be realized simply by directing the sample holder towards a bright diffusive surface (e.g., white wall, printing paper, etc.) in the far field. Regular room light and/or natural light (>100 lumen/m2) provide sufficient illumination.

Overlaying the fluorescence and bright-field images is a common and useful technique to highlight the structures of interest in biological samples. With Pocket MUSE, fluorescence and bright-field contrasts can be combined through a single capture, simply by enabling the UV illumination during bright-field imaging (hybrid mode). As an example, with a thin blood smear, white blood cells (WBC, fluorescence) can be highlighted in a crowd of red blood cells (RBC, bright-field) by simply mixing in a small amount of fluorescent nuclei dyes (e.g., 0.01% w/v acridine orange) in the specimen. It is also possible to apply similar approaches to dense blood samples for cytological quantification and infection evaluation.

Mucosal Smear Imaging

Mucosal smears are used in many medical diagnostic applications such as Pap smears. Mucosal smear preparation for Pocket MUSE is extremely simple and can be performed within 30 seconds. The specimen is collected with a cotton swab that is then dipped in a dye (e.g., propidium iodide with CytoStain™), briefly washed in tap water and smeared onto the sample holder. Compared to bright-field cytology staining, MUSE fluorescence results in a significantly higher contrast between the cell bodies, nuclei and the background. Cell morphology can be clearly visualized over the majority of the FOV due to low aberrations at the edges. Although only a single FOV could be imaged at a time, a larger population of cells could be rapidly reviewed by repeated repositioning of the same swab. In addition, as conventional mucosal smear cytology imaging requires cells to be attached to a flat glass surface, Pocket MUSE allows cells to be imaged directly on the cotton fiber matrices. Finally, because MUSE captures the surface, some volumetric aspects of cell morphology can be visualized.

Selective Bacteria Imaging

Fluorescent staining has been widely used to examine bacteria in liquid samples. As a preliminary demonstration, a bacterial suspension was labeled with fluorescent dyes (e.g., acridine orange) in a simple mixing step. Individual bacteria are smaller than the resolution limit of Pocket MUSE, but their presence can be effectively visualized when if sparsely dispersed in a fluid sample. Suspended bacteria show a distinct twinkling in preview mode due to their movement in and out of the focal plane. In addition, with bacteria-specific fluorescent probes, Pocket MUSE could also differentiate different populations of microorganisms. As a preliminary demonstration, nucleic acid stain (DAPI, which labels all bacteria) combined with peptidoglycan staining (wheat germ agglutinin Alexa Fluor 594 conjugate (WGA-AF594), which labels gram-positive bacteria) can differentiate *Bacillus subtilis* (Gram-positive) and *Escherichia coli* (Gram-negative) bacteria populations based on the color of microbe particles, which could be further quantitatively assessed using signals found in the different color channels of the RGB image.

From the above description, those skilled in the art will perceive improvements, changes and modifications. Such improvements, changes and modifications are within the skill of one in the art and are intended to be covered by the appended claims. All patents, patent applications, and publications cited herein are incorporated by reference in their entirety.

The following is claimed:

1. A method comprising:
   exposing a dispersed cellular sample to one or more exogenous fluorophore and/or fluorescent probe that accumulate in a structure of interest;
   positioning the dispersed cellular sample in contact with a top face of an optical window of an external accessory, wherein the external accessory comprises the optical window and one or more light emitting diodes (LED) configured to provide Type-C ultraviolet (UVC) light;
   positioning the external accessory in focus with a microscope having one or more digital image sensor;
   exciting the one or more exogenous fluorophore and/or fluorescent probe within the sample with the UVC light, produced by the one or more LED, having a center emission wavelength that causes emission by the one or more exogenous fluorophore and/or fluorescent probe, wherein the UVC light transmits through one or more side faces of the optical window and the optical window delivers the UVC light uniformly to a surface of the dispersed cellular sample in contact with the top face of the optical window via frustrated total internal reflection; and
   collecting, with the microscope having the one or more digital image sensor, emitted light from excited ones of the one or more exogenous fluorophores and/or fluorescent probe that creates an image comprising the structure of interest in the sample, wherein the emitted light emits out a bottom face of the optical window to the microscope having the one or more digital image sensor.

2. The method of claim 1, wherein the dispersed cellular sample is a cell suspension, a cytology smear, or a bacteria colloidal sample.

3. The method of claim 1, wherein the one or more exogenous fluorophore and/or fluorescent probe comprise one or more of chemical dyes, quantum dots, proteins, peptides, and oligonucleotides.

4. The method of claim 1, wherein the Type-C ultraviolet light has a center emission wavelength of between 230 nm and 290 nm.

5. The method of claim 1, wherein the one or more exogenous fluorophore and/or fluorescent probe is excitable in a range of 235 nm to 285 nm.

6. The method of claim 1, wherein the one or more exogenous fluorophore and/or fluorescent probe has a useful emission band from 350 nm to 700 nm.

7. The method of claim 1, wherein one or more diffractive optical element is attached to the microscope.

8. The method of claim 1, wherein the microscope comprises one or more cameras, each configured to detect at one or more wavelength ranges from 350 nm to 700 nm.

9. The method of claim 1, wherein the image is projected into red, green, blue, and opacity channels of a standard display device.

10. A method comprising:
    obtaining a fluorescent bioassay;
    positioning the bioassay in contact with a top face of an optical window of an external accessory, wherein the external accessory comprises the optical window and one or more light emitting diodes (LED) configured to provide Type-C ultraviolet (UVC) light;
    positioning the external accessory in focus with a digital optical detecting device;
    exciting the bioassay with the UVC light, produced by the one or more LED, having a center emission wavelength that causes emission by the fluorescent bioassay, wherein the UVC light transmits through one or more side faces of the optical window and the optical window delivers the UVC light uniformly to a surface of the bioassay in contact with the top face of the optical window via frustrated total internal reflection; and
    collecting, with the digital optical detecting device, a signal emitted from the fluorescent bioassay through a bottom face of the optical window towards the digital optical detecting device.

11. The method of claim 10, wherein the bioassay comprises a substrate and one or more fluorescent probe.

12. The method of claim 11, wherein the one or more fluorescent probe comprises one or more chemical dyes, quantum dots, proteins, peptides, and/or oligonucleotides.

13. The method of claim 11, wherein the Type-C ultraviolet light has a center emission wavelength of between 230 nm and 290 nm.

14. The method of claim 11, wherein the one or more fluorescent probes is excitable in a range of 235 nm to 285 nm.

15. The method of claim 11, wherein the one or more fluorescent probes has a useful emission band from 350 nm to 700 nm.

16. The method of claim 10, wherein the digital optical detecting device comprises one or more diffractive optical element and one or more electro-optical sensor.

17. The method of claim 16, wherein the one or more diffractive optical element is a single optical lens, a compound optical lens, and/or a freeform waveguide.

18. The method of claim 16, wherein the one or more diffractive optical element has less than 5% total optical transmittance between 230 nm and 290 nm.

19. The method of claim 16, wherein the one or more electro-optical sensor is a camera sensor, a photodiode, or a photomultiplier tube.

20. The method of claim 19, wherein the one or more electro-optical sensor is configured to detect and separate emitted light from fluorescent probes at one or more wavelength ranges from 350 nm to 700 nm.

* * * * *

UNITED STATES PATENT AND TRADEMARK OFFICE
CERTIFICATE OF CORRECTION

| | | |
|---|---|---|
| PATENT NO. | : 12,281,985 B2 | Page 1 of 1 |
| APPLICATION NO. | : 17/626292 | |
| DATED | : April 22, 2025 | |
| INVENTOR(S) | : Yehe Liu et al. | |

It is certified that error appears in the above-identified patent and that said Letters Patent is hereby corrected as shown below:

In the Specification

Column 1, before the heading TECHNICAL FIELD add the following heading and language:
--GOVERNMENT FUNDING
This invention was made with government support under OD025307 awarded by the National Institutes of Health. The government has certain rights in the invention.--

Signed and Sealed this
Fourteenth Day of October, 2025

John A. Squires
*Director of the United States Patent and Trademark Office*